United States Patent
Chapman et al.

(10) Patent No.: US 12,493,802 B2
(45) Date of Patent: Dec. 9, 2025

(54) SYSTEM AND METHOD FOR CROSS-PLATFORM PERSONALIZED INFORMATION MANAGEMENT

(71) Applicant: SQUIRREL APPLICATIONS LLC, Live Oak, CA (US)

(72) Inventors: James A. Chapman, Live Oak, CA (US); Ed Worley, Loomis, CA (US)

(73) Assignee: SQUIRREL APPLICATIONS LLC, Live Oak, CA (US)

( * ) Notice: Subject to any disclaimer, the term of this patent is extended or adjusted under 35 U.S.C. 154(b) by 0 days.

(21) Appl. No.: 18/889,263

(22) Filed: Sep. 18, 2024

(65) Prior Publication Data

US 2025/0284979 A1    Sep. 11, 2025

Related U.S. Application Data

(60) Provisional application No. 63/561,572, filed on Mar. 5, 2024.

(51) Int. Cl.
G06F 16/24    (2019.01)
G06F 16/2457    (2019.01)
G06N 5/01    (2023.01)

(52) U.S. Cl.
CPC .......... *G06N 5/01* (2023.01); *G06F 16/2457* (2019.01)

(58) Field of Classification Search
None
See application file for complete search history.

(56) References Cited

U.S. PATENT DOCUMENTS

| | | |
|---|---|---|
| 8,839,251 B2 | 9/2014 | Dolph |
| 9,152,222 B2 | 10/2015 | Denker |
| 9,524,147 B2 | 12/2016 | Erlewein |
| 10,146,830 B2 | 12/2018 | Van Os |
| 10,210,051 B2 | 2/2019 | Vallabhaneni |
| 10,447,828 B2 | 10/2019 | Vaidyanathan |
| 11,443,380 B2 | 9/2022 | Cummings |

(Continued)

FOREIGN PATENT DOCUMENTS

| | | | |
|---|---|---|---|
| JP | 2001-92844 A | * | 4/2001 |
| JP | 2013254326 A | * | 12/2013 |

(Continued)

OTHER PUBLICATIONS

ISA/US, United States Patent and Trademark Office (USPTO), Interantional Search Report and Written Opinion issued Apr. 16, 2025, related PCT international application No. PCT/US2025/017622, pp. 1-26, with claims searched, pp. 27-31.

*Primary Examiner* — Augustine K. Obisesan
(74) *Attorney, Agent, or Firm* — O'BANION & RITCHEY LLP; John P. O'Banion

(57) ABSTRACT

A Dynamic Adaptation Information Management System (DAIMS) having a Listener module for monitoring information transfer activity and application communications on a user platform. A user interface allows the users to configure and select information to be viewed and specify information transfer and application communication events of interest to be tracked and processed. The system can also generate actions based on a Neural Network (NN) machine learning model, or Artificial Intelligence (AI), operating on user preferences in tracking and organizing information and transmitting this AI view to the client device.

17 Claims, 11 Drawing Sheets

(56) References Cited

U.S. PATENT DOCUMENTS

| | | | |
|---|---|---|---|
| 2002/0138499 A1 | 9/2002 | Anderson | |
| 2007/0294209 A1* | 12/2007 | Strub | H04L 67/535 |
| 2011/0099486 A1 | 4/2011 | Nesladek | |
| 2013/0311508 A1 | 11/2013 | Grit | |
| 2013/0332544 A1 | 12/2013 | Brian | |
| 2014/0032259 A1 | 1/2014 | Lafever | |
| 2014/0250425 A1* | 9/2014 | Kumar | G06F 11/3072 |
| | | | 717/121 |
| 2015/0195166 A1 | 7/2015 | Kalavade | |
| 2016/0078347 A1* | 3/2016 | Salajegheh | G06N 5/04 |
| | | | 706/12 |
| 2016/0254970 A1* | 9/2016 | Bartholomew | G06Q 30/02 |
| | | | 709/224 |
| 2016/0261472 A1* | 9/2016 | Tubi | H04L 43/0876 |
| 2017/0063735 A1* | 3/2017 | Gillespie | H04L 51/214 |
| 2017/0099592 A1* | 4/2017 | Loeb | G06Q 10/107 |
| 2019/0208412 A1* | 7/2019 | Lord | H04W 12/30 |
| 2021/0027136 A1* | 1/2021 | Hwang | G06F 9/542 |
| 2021/0099541 A1* | 4/2021 | Konstantopoulos | |
| | | | H04L 67/306 |
| 2021/0303269 A1* | 9/2021 | Chu | G06Q 30/0631 |
| 2022/0303257 A1 | 9/2022 | Bhansali | |
| 2022/0385737 A1* | 12/2022 | Daly | H04W 12/02 |
| 2023/0281008 A1* | 9/2023 | Silverstein | G06F 8/73 |
| | | | 717/123 |
| 2023/0421446 A1 | 12/2023 | Lou | |

FOREIGN PATENT DOCUMENTS

| | | |
|---|---|---|
| WO | 2021111400 A1 | 6/2021 |
| WO | 2023016537 A1 | 2/2023 |

\* cited by examiner

550

ACORN

Template: XXXXXXX

WHAT ARE WE TRACKING?
NAMES: _____
SUBJECTS: _____
CONVERSATION WORDS: _____

WHAT APPLICATIONS ARE
WE TRACKING?

☐ TEXTING APP
☐ EMAIL ACCTS
☐ WORD PROCESSING
☐ VOICE MESSAGES
☐ SOCIAL MEDIA ACCTS
☐ FACEBOOK ACCTS

AGIE for
this Template:

TEXTING MESSAGES
☐ _____
☐ _____
☐ _____
☐ _____

SOCIAL MEDIA
☐ _____
☐ _____
☐ _____
☐ _____

WORD PROCESSING DOCUMENTS
☐ _____
☐ _____
☐ _____
☐ _____

EMAIL
☐ _____
☐ _____
☐ _____
☐ _____

FIG. 9

SYSTEM AND METHOD FOR CROSS-PLATFORM PERSONALIZED INFORMATION MANAGEMENT

CROSS-REFERENCE TO RELATED APPLICATIONS

This application claims priority to, and the benefit of, U.S. provisional patent application Ser. No. 63/561,572 filed on Mar. 5, 2024, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to information processing, generation, storage, and retrieval, and more particularly, to a system and method for cross-application personalized information storage and retrieval utilizing Artificial Intelligence (AI) deep learning, rules and filters, frequency analysis and pattern recognition to adapt to the user.

2. Background Discussion

Individuals and businesses generate and consume vast amounts of information. However, this information is often either unstructured or specifically structured or formatted for particular software applications. This information may include images, video, text, text messages, email, voicemail, forms and other documents in other formats, all of which can be manipulated and viewed by a variety of applications. This information is often not readily searchable, retrievable, and/or storable because of structure and formatting variations used by the various applications. Furthermore, context and correlation information of the documentation is often either lost, untagged, unorganized or otherwise not retrievable.

Accordingly, a need exists for a system for managing information which overcomes available technology shortcomings. The present disclosure fulfills that need and provides additional benefits over existing systems.

BRIEF SUMMARY

The disclosed technology is new form of information system referred to herein as a Dynamic Adaptation Information Management System (DAIMS), which overcomes issues with previous information management systems by creating a system that addresses the various relationships through pattern recognition and frequency analysis and other identified processes. The system of the present disclosure is referred to herein as "Squirrel", and it operates in the manner of a user directed co-pilot allowing a consensus to be reached between user and artificial intelligence (AI) deep learning.

The disclosed system learns the relationships during information storage and retrieval utilizing AI deep learning algorithms, rules and filters, AI processes and frequency analysis.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 8 and FIG. 9 are text diagrams of an Acorn template and its information elements according to at least one embodiment of the present disclosure.

DETAILED DESCRIPTION

1. Squirrel Overview

1.1. Object of the Invention

Figure 1:
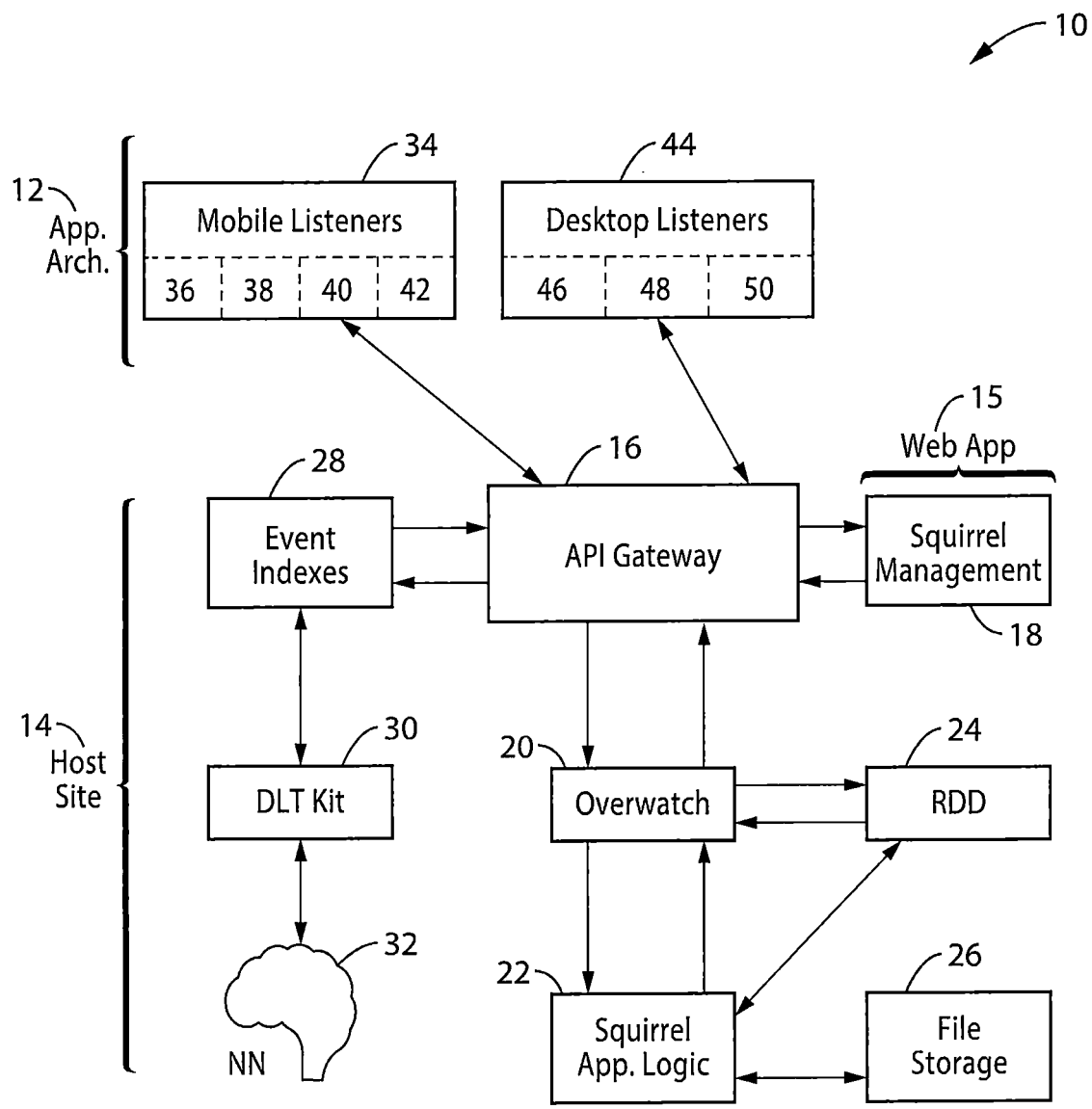
FIG. 1 is a block diagram of the high-level architecture used to facilitate the capture and communication of Acorn Generated Information Elements (AGIE) across the AI optimized Dynamic Adaptation Information Management System (DAIMS) according to at least one embodiment of the present disclosure.

The present disclosure is a Dynamic Adaptation Information Management System (DAIMS) hereafter referred to as 'Squirrel'; which is unlike traditional database or data analysis software and the current outdated methods of information storage and retrieval.

In a traditional "database" operation the users make discrete requests through a search query for information stored and generates a "report" of the files that contain the preferences in the query delineated by the user, this "snapshot" of the files has numerous shortcomings as it does not adapt or regenerate based on new information being generated by the users and can only search the information that has been entered into a database program. The present disclosure describes a system directed at solving these information management issues in a system that learns the relationships during information storage and retrieval utilizing AI deep learning algorithms, Rules and Filters, Frequency Analysis and allows searching all of the information and data being acquired and processed by the user.

1.2. Overview of Squirrel Elements

The unique processes in Squirrel allows the users to create new products that continuously track, make transcription documents and archive the information desired. For example, Squirrel processing of user directed actions on Texting/Messaging applications create Acorn generated information elements (AGIE) identified using the Acorn Malleable Template (ACMT). These actions create Texting/Messaging Transcription Documents (TMTD) documenting the actions of the user, which archives the user interaction on the Texting/Messaging platform which retains all of the meta data of the user actions and generates a text-based document that visually replicates the user actions on the platform in a continuous transcript of the posts made by the user and the interactions with other Texting/Messaging users on that platform. There is a separate Texting/Messaging API module for each Texting/Messaging platform that Squirrel is monitoring with a separate and distinct Texting/Messaging Transcription Documents (TMTD) for each Texting/Messaging application the user identifies. The same process as described for creating TMTD can be adapted for emails, social media, voicemail and other applications; which provide AI optimized dynamic cross-application and cross-platform personalized information storage and retrieval application with on-going and real-time information collection, creation, archiving, retrieval, tracking, and management based on user preferences and information utilization patterns.

Squirrel can be considered a sort of "librarian" performing its duties in the background to constantly update and organize cross application information obtained by a user of a user platform. The Squirrel software system is made up of a number of principle modules working interoperably to provide numerous beneficial services. The present disclosure is generated by a unique process of direct association between a Regenerative Dynamic Directory (RDD) and a linked Acorn Malleable Template (ACMT).

When a malleable template is created, a specific and related Regenerative Dynamic Directory (RDD) is created which is controlled by this specific malleable template. For example, email, texting, and social media transcription documents are generated by the Acorn malleable template directing the AI operations of frequency analysis, pattern recognition, rules, filters, and AI processes (Listener, Stow and Overwatch).

The transcription documents (text edit and metadata) are then noted in the associated RDD table of locations, and that directory is then constantly updated and refreshed based on the event actions of its specific Acorn malleable template.

Squirrel, running as a background daemon like process, is constantly regenerating and refreshing the directory. Hence the term Regenerative Dynamic Directory (RDD) is a description for a novel system concept in terms of directory actions and management.

2. Definitions 2.1. Dynamic Adaptation Information Management System (DAIMS)—A multilayered system that operates on an ongoing and real time environment for the processing of Acorn Generated Information Elements (AGIE) for the collection, archiving, retrieval, tracking and management system based on user preferences and artificial intelligence (AI) recommendations.

2.2. Squirrel—a dynamic cross-application and cross-platform form of Information Management System with on-going and real time Information collection, archiving, retrieval, tracking, and management based on user preferences and AI recommendations (Deep Learning).

2.3. Acorn Generated Information Elements (AGIE)—These are the information, data, documents and files that Squirrel is processing and creating.

2.4. Acorn Malleable Template (ACMT)—The Acorn Malleable template includes parameters, rules, filters and AI processes specifying Information transfer events and application communication events of interest to the particular user and specifying the user's choices for the collection, creation, document generation, sorting, storing, querying, retrieval, and general management of the information the user has determined to be organized and/or archived in the Squirrel Vault using the AGIE Regenerative Dynamic Directory (RDD).

2.4.5. AGIE Regenerative Dynamic Directory (RDD)—The Regenerative Dynamic Directory (RDD) works with the Operating System file manager software and is the table of locations for the tracking of the Acorn Generated Information Elements (AGIE). The Regenerative Dynamic Directory (RDD) is constantly updated and refreshed based on the event actions of the processing of the AGIE and the suggestions based on frequency analysis, pattern recognition, rules, filters and the AI processes used. The Regenerative Dynamic Directory (RDD) is resident on the user devices and synchronized with the AGIE dynamic directory (RDD) in the Squirrel Vault.

2.4.6. SMTD—Social Media Transcription Documents (SMTD)—Squirrel processing of user directed actions on Social Media (e.g., Facebook) creates Acorn Generated Information Elements (AGIE) identified using the Acorn Malleable Template (ACMT) which creates SMTD of the actions of the user using social media.

2.4.7. TMTD—Texting/Messaging Transcription Documents (TMTD). Squirrel processing of user directed actions on texting/messaging applications creates Acorn Generated Information Elements (AGIE) identified using the Acorn Malleable Template (ACMT). These actions create texting/messaging Transcription Documents (TMTD) which document the actions of the user.

2.4.8. VMTD—Voicemail Transcription Documents (VMTD). Squirrel processing of user directed actions on Voicemail applications creates Acorn generated Information Elements (AGIE) identified using the Acorn Malleable Template (ACMT). These actions create Voicemail Transcription Documents (VMTD) documenting the actions of the user.

2.4.9. EMTD—The Squirrel processing of the user directed actions on email creates Acorn Generated Information Elements (AGIE) identified using the Acorn Malleable Template (ACMT) to create Email Transcription Documents (EMTD) of the actions of the user using email media.

2.5. Event Indexes—Formed and logged Acorn Generated Information Element (AGIE) data that is used to train and inform recommendation from deep learning models.

2.6. Neural Network—a machine learning program, or model, which makes decisions by using processes that mimic neurons working together to identify phenomena, weigh options and arrive at conclusions.

2.7. Acorn Module—The Acorn module provides the user interface that allows selection, establishment, and configuration of the desired parameters of an Acorn Malleable Template (ACMT) that is used by Squirrel to monitor and manage Acorn Generated Information Elements (AGIE) to transfer events and application communication events of interest to the particular user. The actions of the user in the Dashboard interface create an Acorn Malleable Template; which includes parameters, rules, filters and AI processes specifying Acorn Generated Information Elements (AGIE) to transfer events and application communication events of interest to the particular user in response to user choices specifying collection, creation, document generation, sorting, storing, querying, retrieval, and general management of Acorn Generated Information Elements (AGIE) the user has determined to be archived in Squirrel. The Acorn module also provides a search engine enabling the user to conduct searches of the AGIE information stored on the user platform or stored in the Squirrel Vault.

2.8. Listener Module—The Listener module of Squirrel is configured to install one or more daemon processes to run in the background under the operating system (OS) and perform monitoring of Information transfer activity specified in the Acorn module and application communications of the OS without the need of user interaction. In particular, the Listener module has a separate API for each application being monitored. The Listener module monitors file accesses via (through) a computing platform file system, a cloud storage archive, information transfers via a network described in each of these types of transfers can be monitored by the Listener module based on a set of user-configurable parameters defined in an "Acorn Malleable Template", including rules and filters and AI algorithms.

2.9. Stow Module—The Stow module is configured to use the Listener module to monitor certain information transfer events, such as when a user device imports a information file from a information source can include files identified or identifiable in an OS file system, Acorn Generated Information Elements (AGIE), such as text messages, email messages, voicemail messages, social media content, tweets, links, or any other discrete and identifiable Information. The Stow module is further configured to capture and or create Acorn Generated Information Elements (AGIE) from an information source based on a pre-defined Acorn Malleable Templates that each specify information of interest to the user. The information can be captured across different user platforms and different user applications. The location of the stored Acorn Generated Information Elements (AGIE) is recorded and displayed in the Acorn module user interface for review access and retrieval.

2.10. Overwatch Module—The Overwatch module executes under the OS in the background. The Overwatch module is configured to monitor and track information file events, such as when a user opens, modifies, or imports an Acorn Generated Information Element (AGIE) file. The Overwatch module checks an OS marker corresponding to each Acorn generated information element (AGIE) that indicates a "last modified" status or state of the information file. The Overwatch module monitors for an event change in this AGIE state from previous state of the AGIE to update the AGIE Regenerative Dynamic Directory (RDD).

3. Example Embodiments

In the following description, for purposes of explanation, numerous specific details are set forth in order to provide a thorough understanding of the various example embodiments. It will be evident, however, to one of ordinary skill in the art that the various embodiments may be practiced with different variations without departing from teachings of the present disclosure.

In various example embodiments disclosed herein, a system and method for cross-application personalized information storage and retrieval is described. An example embodiment operates as application software executed by an information processor in a user computing environment or on a particular user hardware platform, such as a personal computer (PC), server, laptop computer, tablet computer, mobile device, mobile phone, or the like. The application software provides a set of modules serving to implement the various functional elements provided by the application as described in detail below. Each of these modules can be implemented as software components executing within an executable environment of the cross-application personalized information storage and retrieval system operating on an information processor of a user platform. The functional elements, automation, and user interfaces implemented by each of the modules of an example embodiment are described in detail herein in connection with the provided figures. In a particular example embodiment, the cross-application personalized information storage and retrieval application is denoted herein as the Squirrel application (app) or merely Squirrel.

3.1. Problem and Solution Overview

The need for information management is usually highly dependent on the information area (model) to which it is applied. The following example models, are given by way of example and not limitation, as the present disclosure contemplates a customizable ability of providing dynamic adaptation information management across any desired information area/model.

3.1.1. Corporate Business Model

Everyday corporate businesses generate and utilize vast amounts of information from many different types of devices and software systems, under the direction of employees that may not have the ability to facilitate coordinated operations and/or sharing of important information.

For example, during the process of a proposed corporate merger, a massive amount of archived information must be evaluated and condensed to allow a proper, due diligence compliant discovery that will facilitate the vital decision process. Given the need for separation of specific factual information from the large document archives; Squirrel can be utilized to provide the necessary pre-selected information by using Squirrel's malleable template rules and filters, augmented by its continuous AI application of pattern, frequency, and linkage analysis.

3.1.2. Law Firm Business Model

Law firms similarly create, evaluate, and archive huge amounts of information, and are subject to conforming with mandatory legal obligations of information and document preservation. Often, given the long periods of time associated with legal proceedings, problems arise from the ever changing ebb and flow of complex information from many individuals, documents, and the usage of different software and device systems.

For example, a large legal firm has many attorneys, consultants, paralegals, and supporting staff working on a difficult and lengthy case. All involved are using different devices and software, producing and reviewing documents that may not be easily located or identified. Squirrel can provide for continuously tracking and sorting this constant generation and utilization of information, even across Operating System (OS) platforms, using predetermined template(s) to organize information by importance and case value, even aiding in the recognition of information linkage to individuals and activity.

3.1.3. Medical Practice and Healthcare Model

Office, clinic, and hospital-based healthcare delivery and medical practices must continually generate and constantly review vast amounts of information from many sources, utilizing different types of software, hardware, and multiple personnel inputs using systems that may not be compatible in coordinated and integrated operations to easily coordinate and share vital information.

For example, the disclosed system can augment existing Medical management software by allowing individual physicians, allied health professionals, hospitals, and sub-specialty practices to create individual and specific malleable templates to locate, sort, and display their predetermined, necessary, and/or specific portions of patient medical information to allow focused and expeditious provision of care. The disclosed application/system can be utilized to sort through global contents of a medical file, find the desired data, and also continuously upgrade the file as new information is generated for that patient.

3.2. Squirrel Architecture

FIG. 1 illustrates an example embodiment 10 of the high-level architecture used to facilitate the capture and communication of Acorn Generated Information Elements (AGIE) across the AI optimized Dynamic Adaptation Information Management System (DAIMS) in which various embodiments may operate as illustrated.

The application architecture 12 is shown with mobile listeners 34, and desktop listeners 44 connecting to an Application Programming Interface (API) Gateway 16 within a Host site 14.

Mobile Listeners provide accounting for event interactions on multiple mobile devices and applications, exemplified but not limited to the following. An IOS Listener Module 36 provides for listening to IOS text, email, transcribed Voice Messages (VM), Outlook Applications, and similar IOS information. A portable device listener module 38, for example an Android Listener Module 38 provides for listening to Android text, Google mail, Google calendar, and similar Android based information. A META listener module 40 can collect metadata, such as from Facebook, Instagram, Whatsapp, and other application from which metadata may be collected. A Twitter listener module 42 provides for collecting social networking and microblogging platforms such as Twitter.

Desktop Listeners 44 provide accounting for event interactions on desktop devices and applications, which are exemplified but not limited to the following. A Google OS Listener module 46 collects information from Google (or similar search engines and/or email platforms), such as from the Chrome search engine, Gmail, and Google Drive. A Microsoft listener module 48 collects information from Microsoft applications and suites, for example local file directories, One Drive, Outlook, SharePoint, Edge Browser, and applications such as Word, Excel, PowerPoint that may be operating with various file formats, having extensions such as wmv, mp4, png, jpeg, pdf. It will be appreciated that applications and suites from other companies may be similarly addressed. A mapped drives module 50 allows for collecting information in regard to information storage on a mapped drive, such as handling various file formats, such as mp4, png, jpeg, pdf and the like.

In the illustrated embodiment, a host site 14 may include a web server 15, and web server as a Squirrel management interface 18 which is connected to API gateway 16 which receives formatted data from APIs and uses logic to route these for indexing and overwatch. This interface allows users to interact with the host site through a web interface. The API is configured to interact with other network entities on a programmatic or automated information transfer level.

API gateway 16 is connected to event indexes 28 for chronologically capturing monitored information elements for analysis, and is connected through a Deep Learning Tool (DLT) kit 30 to a Neural Network (NN) 32. Event Indexes 28 in combination with the Neural Network 32 are configured for tagging with interconnectivity and context by utilizing a combination of indexing and deep learning to gain insights into information interactions for each user and then making recommendations based on these trends.

The API gateway 16 is also connected to an Overwatch module 20 which provides an event manager and event broker that sends information to the user (consumers). One or more Regenerative Dynamic Directories (RDDs) 24 are connected to the overwatch module. The RDDs may incorporate attributes of a Structured Query Language (SQL) or non-SQL information systems. The RDDs can include stored data, archived data, configuration data, template data, and a repository for any other data as needed.

Squirrel application logic 22, connected to Overwatch module 20, has Stow and Acorn modules and performs template handling, parameter controls, system rules, and filter configurations. Squirrel application logic is connected to RDD 24. In addition, Squirrel application logic 22 has a direct (preferably secure) connection to file storage 26 for storing documents and vault storage.

Figure 2:
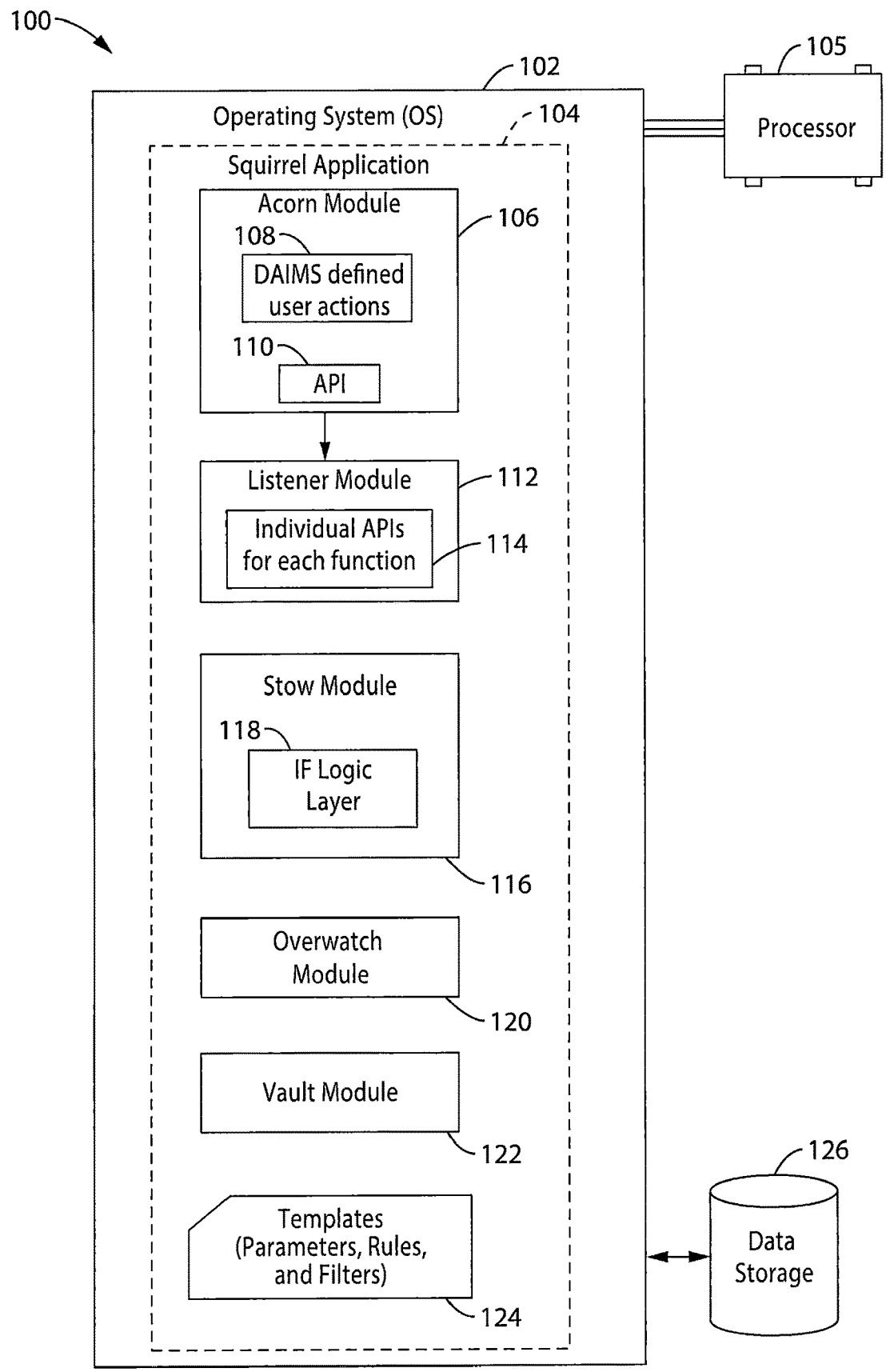
FIG. 2 is a block diagram of modules within the Squirrel application according to at least one embodiment of the present disclosure.

FIG. 2 illustrates an embodiment 100 of modules within the Squirrel application 104 of the present disclosure. The Squirrel application 104 is shown for executing within an operating system 102 for execution by a processor 105 having access to data storage 126. The Squirrel Application 104 is shown with Acorn module 106 having DAIMS defined user actions 108, and API 110. The Acorn module provides an interface through which an Acorn Malleable Template (ACMT) is created and modified to specify how the user wants Squirrel to monitor and manage Acorn Generated Information Elements (AGIE) to transfer events and application communication events of interest.

A Listener module 112 is shown with individual APIs for each function. The Listener module utilizes the individual APIs through which it monitors different types of content accesses through a computing platform based on the ACMTs. For example, the Listener module is configured to manage monitoring, collection, and manipulation of text messages, as well as social media, voicemail, email, word processing and other forms of information content sources, each through its own API.

A Stow module 116 is shown having an user interface (IF) directed logic layer 118. The Stow module is configured to capture and/or create Acorn Generated Information Elements (AGIE) from an information source based on a pre-defined Acorn Malleable Template (ACMT) that specifies the information content of interest to the user, which is utilized by the Listener module to monitor certain information transfer events.

An Overwatch module 120 is shown which executes in the background to monitor and track each Acorn Generated Information Element (AGIE) for changes and updates within an AGIE Regenerative Dynamic Directory (RDD).

A Vault module 122 supports the storage, archiving, and retrieval of the content associated with Acorn Generated Information Elements (AGIE). The modules recited above are described in greater detail throughout this disclosure.

Templates 124 are also shown which contain parameters, rules and filters used by the Acorn and other modules. Data storage is seen 126 coupled for access by the Squirrel application.

It should be appreciated that data sources for the Squirrel application include, but are not limited to text documents, email, voicemail, text messages, social media, websites, mixed document forms, transcribed voicemail messages, files (e.g., text, audio, video, audio, graphics, pictures, and other attachments), applications (e.g., word processing, spreadsheets, accounting, drawing, video, audio), contacts, calendars, search queries, and medical records, and other forms of documents/records. The system is highly configurable to support other electronic contact forms not otherwise listed.

3.3. Squirrel as 'Librarian'

Squirrel is a "librarian" of sorts running in the background to constantly update and organize the cross-application Acorn Generated Information Elements (AGIEs) specified by a user. The platforms can include portable and desktop personal computers, mobile phone Personal Digital Assistants (PDAs), mobile computing devices, tablet computers, and other forms of programmable electronic devices. Squirrel is a software-based apparatus, system and/or method performing management, specialized document creation, extraction, and archiving of Acorn Generated Information Elements (AGIE) across applications, operating systems, various types of user platforms, information storage devices, and cloud-based Information storage. Squirrel serves as a secure file cabinet providing convenient features to store, search, and provide user retrieval of Acorn Generated Information Elements (AGIE).

Squirrel allows people and/or businesses to organize their digital life in a customized personal encrypted information database by bridging the Acorn Generated Information Element (AGIE) flows and storage between applications and computing platforms. The Acorn Generated Information Elements (AGIE) can be stored in a Vault Cloud separately from other applications and user platforms. In a particular example embodiment, Squirrel is a mobile device software application for simplified, yet comprehensive, device Acorn Generated Information Elements (AGIE) retention, expanded storage capability, expedited Acorn generated information element (AGIE) retrieval, and a user perception of seamless interaction between the user platform operation and their personalized Information.

Squirrel is configured to store, record, and document the Acorn Generated Information Elements (AGIE) of interest to a user and provides quick and efficient searching by keywords. Squirrel provides links, such as hyperlinks back to the information sources, as well as call backs to the original Information. Squirrel creates a AGIE Regenerative Dynamic Directory (RDD) of the stored locations of the information. Various definitions and example embodiments are described in detail below.

3.4. Acorn and Acorn "Malleable Templates"

The Acorn module provides the user interface that allows a user to select, establish, and configure their desired parameters of an Acorn Malleable Template (ACMT) that is used by the Squirrel application to monitor and manage and create information transfer events and application communication events of interest to the user. The user creates ACMTs through using a dashboard interface of Acorn.

The Acorn Malleable Template includes parameters, rules, filters and AI processes specifying Acorn Generated Information Elements (AGIE) transfer events and application communication events of interest to the particular user and specifying the user's choices for collection, sorting, storing, querying, retrieval, and general management of the Acorn Generated Information Elements (AGIE) which the user has determined are to be archived in the Squirrel Vault.

The Acorn module also provides a search engine enabling the user to conduct searches of the Acorn Generated Information Elements (AGIEs) stored on the user platform or stored in the Squirrel Vault. As described in more detail below, the Squirrel Vault can include Information storage on the user platform, in cloud storage, or storage in one or more external Information storage devices. The search engine of the Acorn module provides a process enabling the user to search and retrieve user Acorn Generated Information Elements (AGIE) that have been received through an information transfer event (specified in the Acorn Malleable Template), imported into the user platform, or pre-existing on the user platform.

The search engine of the Acorn module can also provide a process enabling searching for information across computing platforms or information storage platforms, wherein the information is stored on other devices, in cloud memory outside of Squirrel, on external hard drives, flash memory, and other forms of storage that can be accessed for reading and writing.

The Acorn module allows for the addition of information from applications and/or files that are outside of initial user preferences. The user interface of the Acorn module can be used to modify a user Acorn Malleable Template (e.g., parameters, rules, filters and AI processes to allow for on-going capture of the specified Acorn Generated Information Elements (AGIE), or just for single event usage as needed. The user interface of the Acorn module enables a user to create or modify a user Acorn Malleable Template (ACMT), in regard to parameters, rules, filters and AI processes, by enabling selection or specification of keywords of interest, IP addresses of interest, devices, people, dates, applications, or information types of interest, or any metric that can be utilized as a key search term. The Squirrel search engine is configured to extract stored information in a format and organization selected by the user, as defined in the ACMT. The extracted Information can be framed as global or focused, cross application or single application, or organized by information type.

The Acorn module of the Squirrel application allows the user to set the parameters in an Acorn Malleable Template (ACMT), the parameters specifying the Information sources, including the applications, which are to be monitored by the Squirrel application. The Acorn module enables the user to set the rules and filter parameters, which are used by the Listener, Stow and Overwatch modules as described in more detail below.

The Acorn module can direct the operational decisions for the Listener, Stow and Overwatch modules to manage information monitoring, extraction, and collection by the Squirrel application. The Acorn module directs the information flows to the information storage devices and/or the dedicated user cloud storage (Squirrel Vault). The Acorn module further directs the creation of the information tables and other information used to manage the location, status, and content of information under the management of the Squirrel application. The Acorn module is further configured to notify the user on a regular basis regarding the number of information records archived and updated during a user-defined period of time.

The Acorn module is further configured to monitor and track user search patterns to constantly update the Acorn Malleable Templates for the extraction, organizing, and archiving of AGIEs. The Acorn module is further configured to query the user to allow the user to set search preferences, and to establish rules, filters and AI processes of the Acorn Malleable Template (ACMT) that can continuously update the user's workflow and process patterns based on a frequency analysis, and/or to set up or update default parameters used for the operation of the Squirrel application.

In an example embodiment, the user interface of the Acorn module can enable the user to perform a variety of functions, including the following:

(1) Select one or more user platforms, computing devices, memory devices, information storage devices, or applications of interest to monitor, search, access, and archive.

(2) Provide a view of devices and/or applications selected or available for selection for Squirrel monitoring and archiving and allow the selection and deletion of devices and/or applications for Squirrel action.

(3) Establish and review the Acorn Malleable Templates (ACMT) (e.g., parameters, rules, filters and AI processes) the Squirrel application will use to configure information monitoring and actions taken upon the information transfer events and information archiving of interest to the user. Thus, the user can create, review, and edit the Acorn Malleable Templates for use by the Squirrel application.

(4) Provide a search engine enabling a user to search archived files using configured Acorn Malleable Templates (ACMTs). In addition, the search engine also allows the user to modify or expand the configured Acorn Malleable Templates (ACMTs) for a particular application and create a new information table based on an executed search.

(5) Display the archived Acorn Generated Information Elements (AGIE) retrieved from the Squirrel Vault as "folders" for each application from which the information was retrieved. It enables the user to open and access the retrieved Acorn Generated Information Elements (AGIEs) for each application by selecting the desired folder.

(6) Allowing the user to designate the same Acorn Malleable Template(s) (ACMTs) configured for one application to be applied to multiple applications.

(7) Allowing the user to designate a length of time, or a termination time, within which the Squirrel application will maintain the archived Acorn Generated Information Elements (AGIEs) on a local or cloud storage device.

(8) Allowing the user to designate which information or information types to export, transfer and/or archive.

(9) Allowing the user to print a directory of files saved in the archive. Multiple files and/or individual files to be archived can include "bundled" files that use the same Acorn Malleable Templates.

(10) Allowing for the display of a list of the computing devices, memory storage devices, and applications that the Squirrel application is monitoring to create the unified Squirrel Vault. For example, each item can be displayed as a graphic icon.

In FIG. 2 was already generally seen how the Acorn module was coupled to the other modules of the Squirrel application. The following sections will provide additional details on these elements.

In the various example embodiments disclosed herein, Squirrel is a dynamic cross-application and cross-platform "personalized information storage and retrieval application" with on-going and real time information collection, creation, document generation archiving, retrieval, tracking, and management based on user preferences and Acorn generated information element (AGIE) pattern analysis. A particular embodiment of the Squirrel application includes features for installing a resident information collection or Listener module that is tailored to the user requirements based on parameters, AI Algorithms, rules and filters specified by the user and by generic rules and filters and AI processes determined by patterns of information retention in the public at large. The Squirrel application is configured to monitor the incoming and outgoing information traffic as specified by the Acorn Malleable Template created in Acorn on a user platform.

In a particular example, a message header of an incoming message or file from one of a variety of information sources can be monitored and compared with a pre-defined set of Acorn Malleable Templates (e.g., parameters, rules, filters and AI algorithms), which define the information content of interest to a particular user. If the incoming message or file matches an element of a user Acorn Malleable Template, further action by the Squirrel application is triggered. When so triggered, the Squirrel application is configured to monitor events and analyze Acorn Generated Information Elements (AGIEs) which are associated with these event triggers. Where necessary, alternative methods other than an API request, may be used to extract data within legal parameters of that data type.

For example, certain items may need to be scanned using Optical Character Recognition (OCR) or Direct image to Convolution Neural Networks to extract data for analysis as needed and approved by the user. The message or information file including the header, body, and/or trailer may be extracted from the original information transmission, and then the original message or information file is returned to its standard routing.

The Acorn Malleable Template parameters, rules, filters and AI processes enable user configuration of the capture, processing, Document generation placement, and encryption of the copied for storage in a cloud information vault based on selected user options. As described herein, the term "Stow-ed" or "Stowed" refers to a user's engagement with a user interface provided by the Squirrel application that allows the user to establish and configure their desired parameters for the collecting, sorting, storing, searching, and retrieval of information from various information sources, which the user prefers to be archived and controlled under the Squirrel application.

An Acorn module, provided as part of the Squirrel application, supports the configuration of these parameters by the user. The parameters provided by the user via the Acorn module user interface (dashboard) can be retained as the parameters, rules, and filters of a user Acorn Malleable Template. New information from various information sources in either incoming or outgoing information transmissions (e.g., text messages, emails, voice messaging, voicemail, social media posts, photos, video, web Information, and other forms of information content) can be instantly "Acorn-ed" by the user to flag the information transmission and mark the content of the information transmission as under control of the Squirrel application. As a result, the user has full control of the information and information types captured and processed by the Squirrel application. The information Acorn Generated Information Elements (AGIE) tracked and/or captured by the Squirrel application can be indexed, converted, translated, filtered, compressed, encrypted, and archived based on the Acorn Malleable Templates (ACMTs) configured by the user.

As described in more detail below, the Squirrel application includes a Stow module and an Overwatch module, which are continuously running in the background to (1) monitor all incoming and outgoing information transmissions, and (2) monitor a dedicated Squirrel Vault information storage device and Squirrel cloud storage for information transfers specified by the ACMT.

A Vault module provided as part of the Squirrel application supports the storage, archiving, and retrieval of Acorn Generated Information Elements (AGIE) content under control of the Squirrel application. As described in more detail below, an Overwatch module, provided as part of the Squirrel application, supports the sorting and cataloguing of information by utilizing application specific Acorn Malleable Templates, which use parameters, rules, and filters and AI processes to create and constantly update information tables in the AGIE Regenerative Dynamic Directory (RDD).

In various example embodiments, the Squirrel Application provides monitoring, capture, processing, storage, and indexing of information from at least the following information sources: email; Text Messages (e.g., SMS, MMS, RCS, APN); Pictures (e.g., JPEG, TIFF, etc.); Transcribed Voicemails; Contact Lists/Contact Groups; Facebook posts; Instagram posts; Twitter posts; Tumblr posts; Pinterest; Reddit posts; SnapChat posts, down loaded photos and videos; TikTok posts; downloaded information or files from Google Drive; calendar appointments with comments about the date, appointment, and/or reservations; Web links or website Uniform Resource Locators (URLs); snapshots of webpages with Web addresses attached; saved screen shots; contact information from any source; user names and passwords for accounts (credential manager information); word processing (text editor) documents, spreadsheets, slide decks, PDFs, and content of other formats; medical records or doctors notes; prescription information from email or documents; scanned documents or pictures; photos; complete device backups to a selected vault; legal documents; billing information; arbitrary files by folders.

A user option is provided to extract and save word processing documents, emails and triggered events and to select what format to store the extracted information for the transcription documents or log files which cannot be edited for legal compliance reasons.

3.5. Listener Module

During installation, the Squirrel application can install one or more daemon processes (denoted as the Listener module) to run in the background under the operating system (OS) and monitors the information transfer activity and application communications of the OS. In particular, the Listener module monitors file accesses through a computing platform file system, a cloud storage archive, information transfers via a networked application (app), such as an email app, a texting app, social media apps (e.g., Facebook, Instagram, Twitter, Tumbler, Pinterest, SnapChat, Tick Tok, etc.), and information transfers via an installed application, such as word, numerical or drawing applications (e.g., Microsoft Office products including Word, Excel, PowerPoint, Visio, etc.).

As described in detail below, each of these types of information transfers can be monitored by the Listener module based on a set of user-configurable parameters defined in an Acorn Malleable Template, including rules and filters and AI algorithms. For example, a user can configure an Acorn Malleable Template to cause the Listener module to only monitor email messages, but not text messages. The user can configure an Acorn Malleable Template to cause the Listener module to only monitor specified networked applications or installed applications. The user can also configure an Acorn Malleable Template to cause the Listener module to monitor information transfers from specified sources, of specified types, within specified time frames, and including or excluding specified content. In essence, the user-configurable Acorn Malleable Templates enable a user to cause the Listener module to target the specific information transfers of interest to the particular user.

In the example embodiment, the Listener module can be implemented as a single software Listener component executable by an information processor or a plurality of executable Listener components under management of the Listener module. For example, one of the plurality of executable Listener components can be dedicated to an email application while a different one of the plurality of executable Listener components is dedicated to a texting application. Others Listener components within the plurality of executable Listener components can be dedicated to other apps or information transfer sources.

Each of the one or more Listener components of the Listener module can be daemon processes running continuously in the background under the OS and monitoring information transfers as specified by the user-configurable Acorn Malleable Template(s). When the Listener module, and/or one or more of the Listener components therein, detects an information transfer event or related state change of interest to the particular user, the Listener module is configured to signal, call, message, cause execution of, or otherwise activate one or more other modules of the Squirrel application to handle the detected information transfer event or related state change.

For example, the Listener module can be configured to activate the Overwatch module and/or the Stow module, depending upon the type of detected information transfer event or related state change, and depending on the Acorn Malleable Template (ACMT) configured by the user through the Acorn module, as described in more detail below. In an example embodiment, the Listener module can detect a variety of information events or related state changes including, but not limited to, a change, addition, or deletion of information stored on a information storage device, file system, cloud storage, or memory device. Once an information transfer event or related state change is detected, the Listener module can activate an appropriate module of the Squirrel application and then return to a monitoring mode listening for the next information transfer event or related state change. The relatively short execution duration of the Listener module can minimize the latency impact of Squirrel application to the OS of the device on which the Squirrel application is executed.

The Listener module acts as a software "trip wire" so that the whole Squirrel application is not required to always reside in the active memory of the device until needed. Each of the one or more Listener components of the Listener module can be containerized applications with a minimal resource footprint, which can be executed on a continuous basis to detect information transfer events or related state changes of interest to the user. The Listener module can be implemented without modification of the OS kernel. In a particular example embodiment, the Listener module can be configured to utilize existing capabilities of conventional monitoring software, and events driven by APIs and subscribed events.

3.6. Stow Module

The Stow module provides monitoring of all sources of information transfer into and out of the user platform device whether the information was generated on the user platform device, or originated from other devices. As a result, user information files, emails, text messages, transcribed voicemail messages, and other information files manipulated within the user platform can be monitored and managed by the Squirrel application.

The Listener module, Stow module, and Overwatch module actions can be configured via the Acorn module and retained as parameters, rules, and filters and AI processes in one or more Acorn Malleable Templates. In this manner, Acorn Generated Information Elements (AGIE) creation, information monitoring, retrieval, sorting, conversion, and storing actions are directed by user based on the rules and filters and AI processes established an Acorn Malleable Template via the Acorn application.

In an example embodiment, the Stow module is an executable module that runs under the OS in the background and is in information communication with the Listener module, described above. The location of the stored files and/or information is recorded and displayed in the Acorn module for user access and retrieval.

The Stow module is configured to use the Listener module to monitor certain information transfer events, such as when a user device imports an information file from an information source. As used herein, the term "information file" can include files identified or identifiable in an OS file system, information objects, text messages, email messages, tweets, links, or any other discrete and identifiable Information. The Stow module is further configured to capture Acorn Generated Information Elements (AGIEs) from an information source based on a pre-defined Acorn Malleable Template that specifies the information of interest to the user. The information can be captured across different user platforms and different user applications. For example, the Stow module can be further configured to direct captured information to a suspense file for action as the information moves to a device target application, where further possible user-directed Squirrel application interaction can occur, if desired. In this example, the Stow module serves as a sorting and Stowing processing module.

Figure 3:
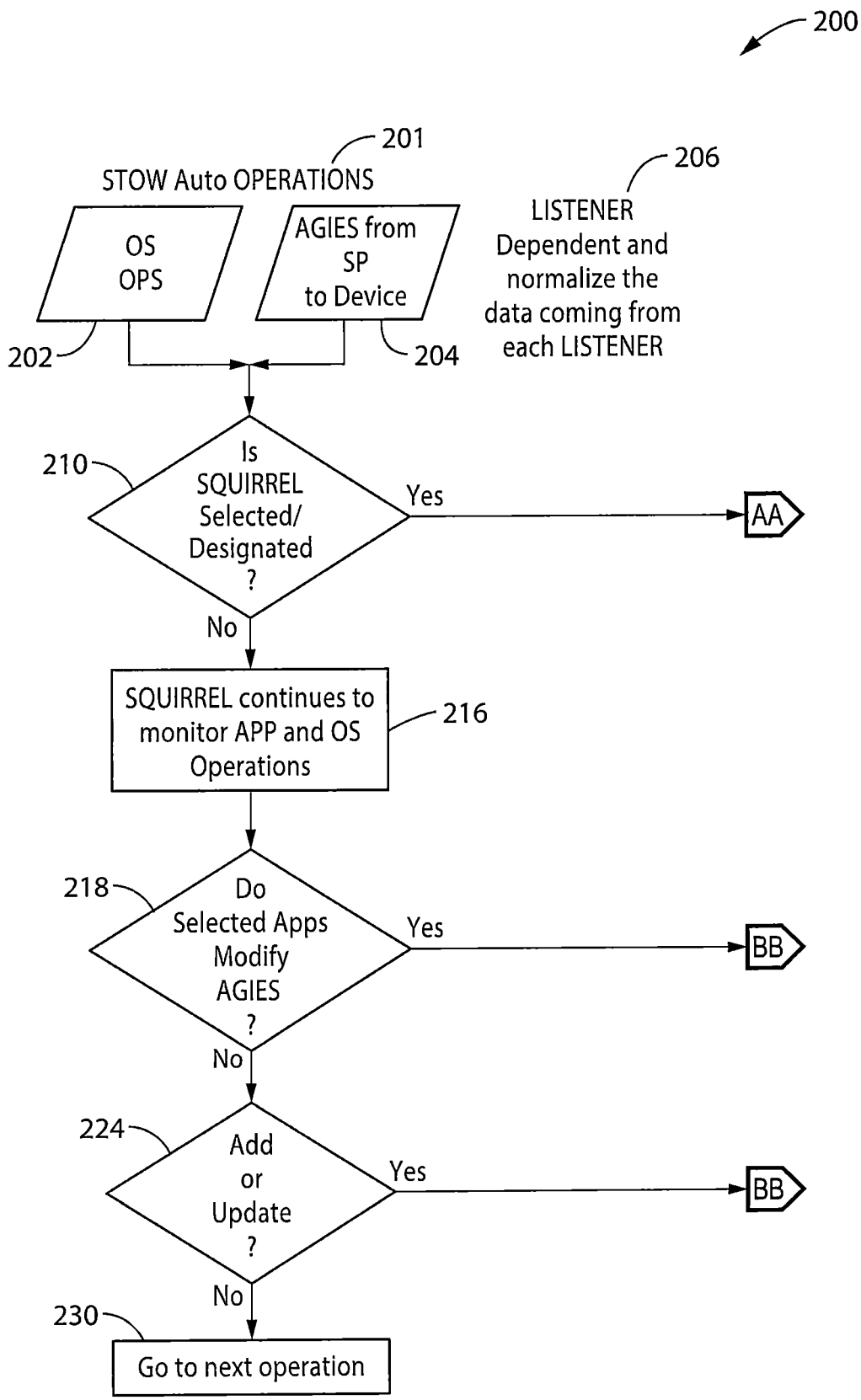
FIG. 3 and FIG. 4 is a flow diagram of certain Acorn and Stow module operations according to at least one embodiment of the present disclosure.
Figure 4:
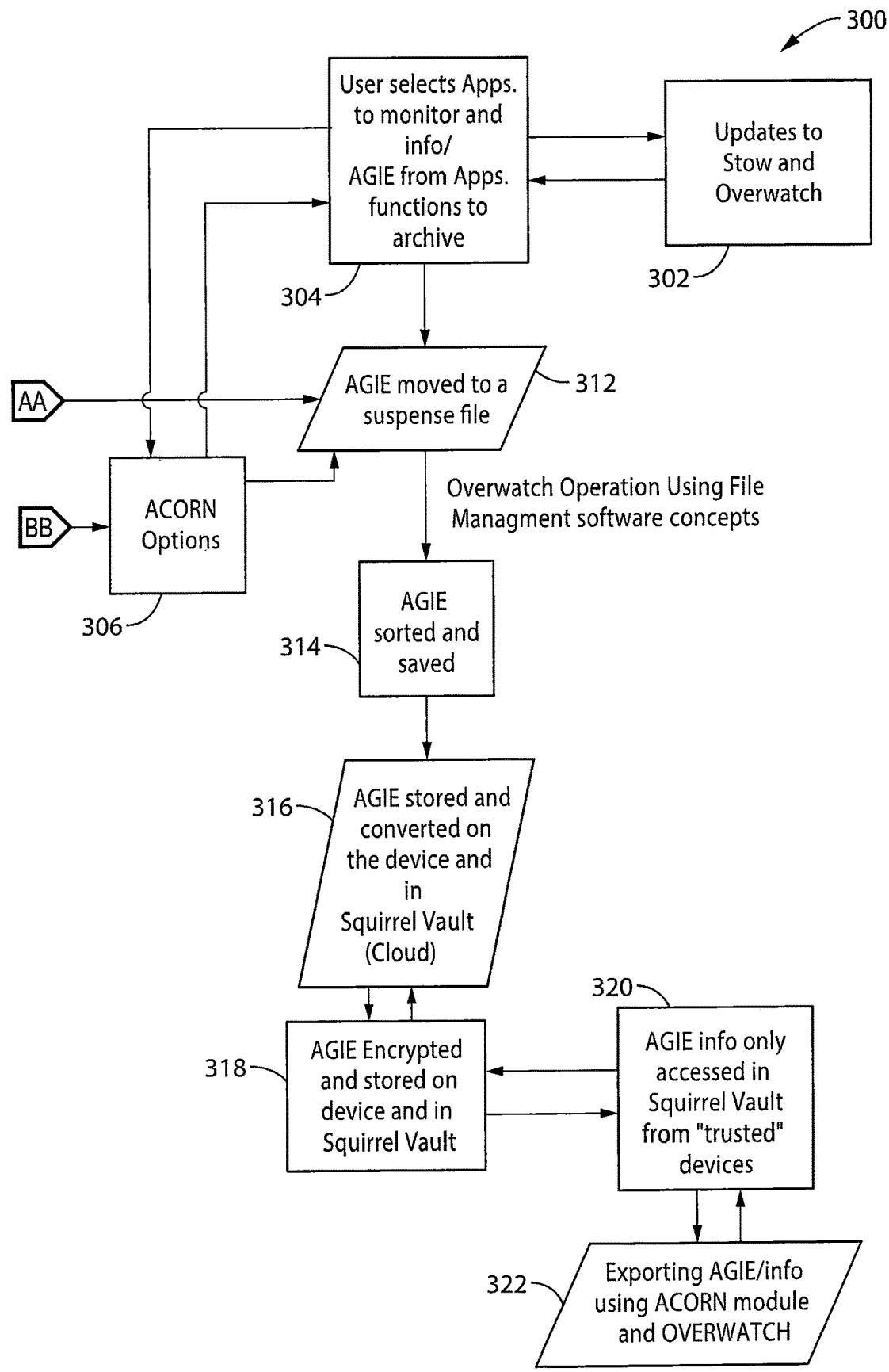

FIG. 3 and FIG. 4 illustrates an example embodiment 200, 300 of certain Acorn and Stow module processing operations. In FIG. 3 the Stow module 201 performs automatic operations and uses the Listener module 206 which monitors OS operations 202 and information transfer events 204 from a service provider (SP) or other information source to/from the user platform.

The following operations are performed in the background, as part of the Overwatch module. At block 210 it is determined if the information corresponding to a monitored information transfer is of interest to the user based on parameters, rules, and filters, AI processes, SPAM and anti-virus software, and similar filtering mechanisms, of a user pre-defined Acorn Malleable Template (by use of the Acorn module, described above).

If the information corresponding to a monitored information transfer is not of interest to the user based on an Acorn Malleable Template, then processing continues down to block 216 in which the Stow module continues to use the Listener module to monitor OS operations and information transfer events from a service provider or other information source to/from the user platform.

The Stow module, using the Listener module, is also configured to monitor information transfer events from a monitored application to/from the user platform.

It is determined at block 218 if applications selected for being monitored are processing, establishing, or modifying data or other information. Thus, Squirrel is using the Acorn Generated Information Elements (AGIE), which is transferring events from an application being monitored by the Stow module, of interest to the user based on parameters, rules, and filters of a user pre-defined Malleable Template (by use of the Acorn module, described above).

If the condition is not met, then execution moves to decision block 224 which determines if the user desires to add monitoring for information transfer events for additional applications. More specifically, it is determined if the user wants to add an additional application to be monitored, or update the template in regard to rules and filters, or in regard to additional data or information to be archived when activated while using this application on the device.

If the user does not want to add or update the monitoring, then execution moves on to the next operation 230; although it should be appreciated that this monitoring operation continues in the background.

Returning now to consider the flow when decision conditions, at blocks 210, 218 and 224, are met.

If the conditions of either decision blocks 218 or 224 of FIG. 3 are met, then execution moves to block 306 in FIG. 4 to handle Acorn options, either by a pop up associated with the context, such as for decision block 218, 224, or allowing other selections to be made.

For example, the Acorn module can generate a pop-up menu for the user within a current application, the pop-up menu offering the user an option to be directed to the Squirrel application for configuration or modification 304 of an Acorn Malleable Template. The Acorn Malleable Template configuration can enable the user to update the user preferences for the monitoring and retrieval of information within the application. The user can then be returned to the current application, with an update being saved 302 for Stow and Overwatch.

If the condition of decision block 210 of FIG. 3 is met and the overwatch module finds that user selected information/data is changed, then execution moves to block 312 in FIG. 4 where the data is moved to a suspense file.

The information corresponding to a monitored information transfer or change was determined to be of interest to the user based on parameters, rules, and filters and AI processes of a user pre-defined Acorn Malleable Template as interpreted by the Acorn module. In this case, the information corresponding to the information transfer of interest is retrieved and moved to this suspense file 312 for review by a user via the user interface of the Acorn module. The information in the suspense file can be reviewed and dispatched for further action by the Squirrel application. It should be appreciated that the user need not necessarily review items in the suspense file, and in at least one embodiment the user can select the notice level of the actions taking place in the Acorn dashboard menu by determining selection and preferences for notifications.

Once the information in the suspense file is dispatched for further action, then at block 314 the Stow module can sort and/or filter the information and save the Acorn Generated Information Elements (AGIE) in files and folders designated by an Acorn Malleable Template configured by the user.

The Acorn Generated Information Elements (AGIE) can be optionally stored 316 on the user platform, or in a Squirrel Vault cloud information storage archive separately from other application information stored on the user platform.

Additionally, the stored information can be synchronized and updated according to rules configured in the Acorn Malleable Template. The Acorn Malleable Template rules can configure and define the desired method for filtering and saving the Acorn Generated Information Elements (AGIE) based on the frequency analysis maintained by the Acorn module.

Once the Stow module determines the desired method for filtering and saving the Acorn Generated Information Elements (AGIEs) based on the rules configured in the Acorn Malleable Template and the frequency analysis, the Stow module can encrypt and store 318 the information in the Squirrel Vault. After the Acorn Generated Information Elements (AGIEs) is stored in the Squirrel Vault, the user can access the Acorn Generated Information Elements (AGIEs) using the Acorn module user interface, described above, on a trusted and authorized user platform. The user can access the Acorn Generated Information Elements (AGIEs) directly from the trusted and authorized user platform or from a Squirrel application website using the trusted and authorized 320 user platform.

The Acorn Generated Information Elements (AGIEs) can also be exported 322 using the Acorn module user interface or the Overwatch module, described in more detail below. In an example embodiment, the Acorn Generated Information Elements (AGIEs) can be stored in at least two formats: (1) the original information format as received from an application, and/or (2) a converted information format for convenient storage or searching. For example, the information can be converted to a text or HTML format, or the like, which can be searched using keywords. The meta-information for the stored information can also be retained for improved searching and for rendering the information in an original form. In particular, the source device identifiers, date/time stamps, information type, path, links, status, and other meta-information can be retained with the stored Information. In this manner, stored information with content including text, graphics, video, emojis, and other content forms, can be accurately rendered when retrieved or exported by the user.

3.7. Overwatch Module

In the described example, the Overwatch module receives and directs events and subscription information to the other modules as they are subscribed to the event driven transactions from the listener modules and internal system architecture.

The Overwatch module is configured to monitor and track information file events, such as when a user opens, modifies, or imports an information file. The Overwatch module checks an OS marker corresponding to each of the Acorn Generated Information Elements (AGIEs) that indicate a "last modified" status or state of the Acorn Generated Information Elements (AGIEs).

The Overwatch module monitors for a change in each Acorn Generated Information Element (AGIE) state from a previous state of that Acorn Generated Information Element (AGIE) file. In at least one example embodiment, the "last modified" status or state of an Acorn Generated Information Elements (AGIE) can correspond to a last modified date/time stamp on the information file header. The Overwatch module is also configured to monitor the information storage utilization, load balancing, and information storage fragmentation of information maintained in the Squirrel Vault.

The Overwatch module can be configured to perform compaction operations to minimize the fragmentation of information and to keep both the user platform information storage and Vault information storage efficient to allow faster access and less storage usage. The Overwatch module can also be configured to monitor available user platform device storage capability and adjust information flow into the Vault as needed to avoid over utilization of device memory capability.

When the Overwatch module detects an Acorn Generated Information Element (AGIE) event, such as when a user opens, modifies, or imports a Acorn Generated Information Element (AGIE), the Overwatch modules update the event subscribers of the information file against an existing list of tags or search criteria for Acorn Generated Information Elements (AGIEs) of interest or already encountered. If the information file is new and does not have any existing tags or search criteria, the Overwatch module can use the Acorn module to query the user to determine whether the user wishes to tag the information file as new or add the information file to an existing tag list. The Overwatch module can update the existing tag list accordingly.

As a result, the Overwatch module can modify, save, store, and manage the tags and search criteria of a variety of different types of user information files. This enables the Squirrel application to perform searches across different types of information files including, information objects, text messages, email messages, tweets, links, or any other discrete and identifiable Information. As such, the Overwatch module serves as a continuous "librarian" running in the background to regularly update and organize the cross application Acorn Generated Information Elements (AGIE) from an information file event.

Figure 5:
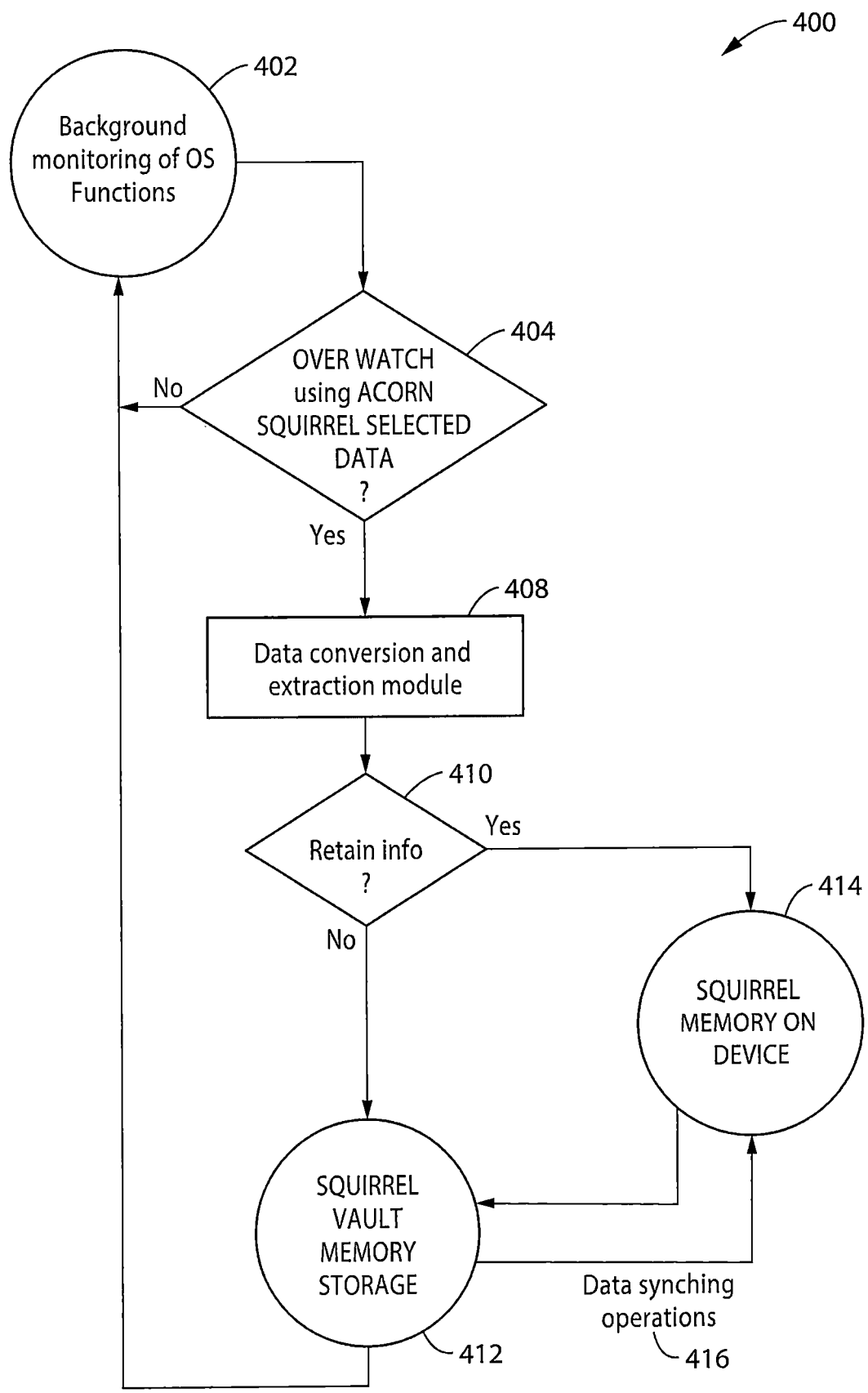
FIG. 5 is a flow diagram of certain Squirrel Overwatch operations according to at least one embodiment of the present disclosure.

FIG. 5 illustrates an example embodiment 400 of a portion of the Squirrel Overwatch operations in the Squirrel application. The Squirrel application can use its Listener module to monitor information file transfers and application usage via the corresponding Operating System (OS) operations 402. The types of information file transfers, application usage, types of information files, and other customization parameters can be configured by the user via the Acorn module as also described above. As part of its background monitoring function, the Overwatch module can monitor information transfer events and application activity 404 based on the events and activity configured to be of interest by the user in an Acorn Malleable Template. If the condition is not met, then execution returns back to 402 in performing its overwatch function.

If the condition is met with the detected information transfer event or application activity being of interest to the user, or if the information transfer event or application activity corresponds to a pre-existing archived information file processed by the Squirrel application, then the application can perform information extraction and conversion 408 on the Acorn Generated Information Elements (AGIEs) of interest to the user.

It is determined at block 410 whether the converted/extracted data/information is to be saved. If it is not to be saved, then data goes to the Squirrel vault memory storage 412, after which execution returns to the start of monitoring loop 402. It should be appreciated, for the sake of simplicity of flowchart illustration, that this flowchart and the other flowcharts of the present disclosure depict a conventional sequential flow, although it should be appreciated that these may be handled as separate processes/tasks and other execution mechanisms without departing from the teachings of the present disclosure.

If it is determined in decision block 410 that the information is to be retained then the Overwatch module performs information processing actions 414 on the information file to prepare the file for storage in the Squirrel Vault. All information storage can use a logical information reference or virtual memory techniques to enable more flexible and faster access. If user actions are detected, such as based on user action via the Acorn module, with the user adding or deleting an Acorn Generated Information Elements (AGIEs), then the corresponding AGIE Regenerative Dynamic Directory (RDD) can be updated.

The file Acorn Generated Information Elements (AGIEs) may be initially stored in the user platform device memory 414 or the Vault 412 depending on the availability of user device memory. If information is imported from other storage devices or external cloud storage not affiliated with the Squirrel application, then the imported information can be pre-screened by the Squirrel application to determine if any actions (as directed by the Acorn module) should be taken.

The Overwatch module can be configured to monitor which files reside on the user platform device, and which files reside in the Vault. The Overwatch module can be configured to move or rearrange 416 Acorn Generated Information Elements (AGIEs) between the user platform device and the Vault according to a frequency analysis (e.g., a frequency of file access, usage, or modification), file size, file type, available device memory, and user device parameters that were set up by the user via the Acorn module. Users can move information files or documents on a Personal Computer (PC) or other user platform to the Squirrel Vault directly via a click and drag function to a Squirrel Icon shown on a user interface to skip a standard document storage process. This action will trigger the Stow module to connect, to update the Acorn settings automatically, and to initiate the Overwatch module to select a storage location (e.g., a logical drive) for the Acorn Generated Information Elements (AGIEs) and update the associated AGIE Regenerative Dynamic Directory (RDD).

For example, this process can be performed using a Squirrel application of an example embodiment installed on a device, such as a smart phone or tablet, by the user tapping a Squirrel icon on the user interface of the smart phone or tablet to initiate the click and drag function. This feature of the Squirrel application of an example embodiment improves the existing technologies by providing a time saving and easy to use method of information archiving and storing. User Acorn Generated Information Elements (AGIEs) stored in the Squirrel Vault can be available in a readable format even if the originating application is no longer available, supported, or the user has decided to stop the utilization of the originating application or OS associated with the initial generation of the Information.

For the sake of simplicity of illustration FIG. 5 did not depict the process in which the Acorn module provides an on-going opportunity for the user to update the Acorn Malleable Template to configure and identify the types of information transfer events and application activity of interest to the user, as was shown in FIG. 4.

3.8. Listener Module

In an example embodiment, the Squirrel application can operate in at least two modes: (1) a standalone mode to allow the configuration of the Acorn Generated Information Elements (AGIEs) collection, selection, capture, archiving, and retrieval of Acorn Generated Information Elements (AGIE); and (2) a background mode to enable the collection of the Acorn Generated Information Elements (AGIEs) designated by the user to be of interest. Once the user configures the desired information manipulation parameters, rules, and filters and AI processes in an Acorn Malleable Template using the Acorn module user interface, the Squirrel application can transition to a background mode to start monitoring and collecting information as configured by the user.

In one example embodiment, the user can configure the collection and manipulation of text messages transferred between the user platform and a texting application. The Squirrel application provides a Texting module to manage this monitoring, collection, and manipulation of text messages.

3.8.1. Listener module Handling Text and Messaging

Figure 6:
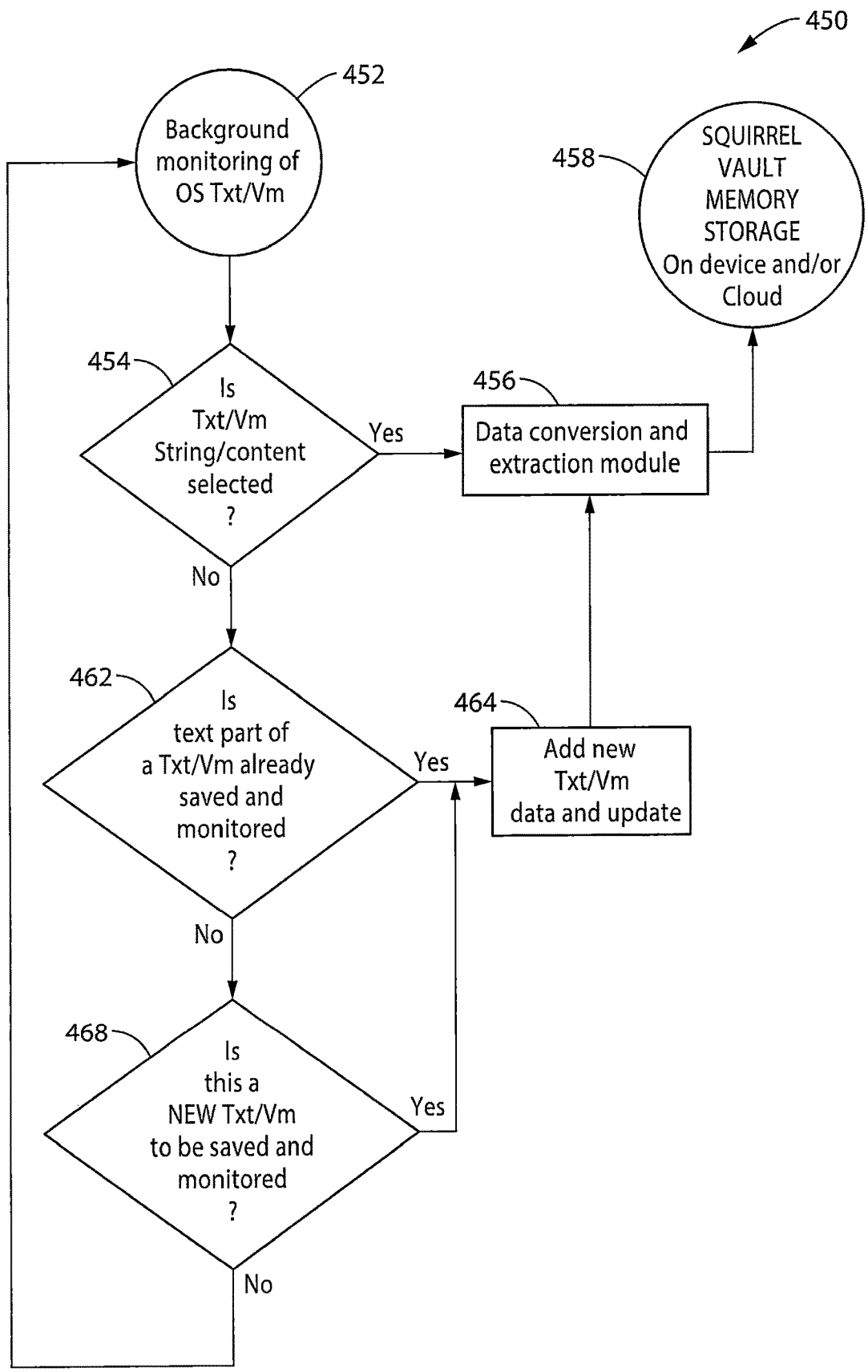
FIG. 6 is a flow diagram of processing performed in a Listener module having texting/voicemail APIs, according to at least one embodiment of the present disclosure.

FIG. 6 illustrates an example embodiment 450 of processing within the Listener module in handling texting, email, messaging or voicemail (VM). It will be noted that a separate API is utilized by the Listener module for each different form of information content.

It is well recognized that text content, email content and messaging content are readily converted from one to another, whereby the following considers both email and messaging as subsumed under the category of texts. By way of simplicity of illustration, and the similar nature of these inputs, the figure depicts texting and voicemail being performed by the same process steps (although different APIs), as it is well recognized that stored voice segments can be readily analyzed/converted/transcribed to determine and/or store their content in the manner of texts and messaging.

The Squirrel processing of the user directed actions on texts, messaging and voicemail applications creates Acorn generated information elements (AGIEs) identified using the Acorn Malleable Template (ACMT). These actions create Texting/Messaging Transcription Documents (TMTD), or Email Transcription Documents (EMTD), or Voicemail Transcription Documents (VMTD) which document the actions of the user, which are new documents created to archive user interaction on the texting, email, messaging, or voicemail platform that retains all of the meta data of the user actions and generates a text based document that visually replicates the user actions on the platform in a continuous transcript of the posts made by the user and the interactions with other texting/voicemail users on that platform. In at least one embodiment there can be a separate texting, messaging, voicemail API module for each texting, messaging, and voicemail platform that Squirrel is monitoring with a separate and distinct Texting, Messaging, or Voicemail transcription document for each texting, messaging, and voicemail application the user identifies.

After the user has configured an Acorn Malleable Template to manage texts, messages, voicemails in a desired manner, the Squirrel application can enter the background mode to monitor 452 the OS for this content. The Listener module, described above, can be used for this purpose. When text/voicemail content is detected, the module compares 454 the text messaging event with an Acorn Malleable Template configured by the user to determine if the event is of interest to the user.

If the event is of interest to the user, based on the Acorn Malleable Template, the module can perform a variety of processing operations on the information file corresponding to the event. For example, the module can perform 456 information conversions, decryption/encryption, compression, formatting, editing, meta-information updates, indexing, extraction operations, and/or other forms of conversion or filtering, to prepare the information file for storage in the Squirrel Vault 458. Additionally, multiple versions of the information file can be generated to facilitate searching, storage, and rendering operations. As a result, the information file can be stored in an original form for rendering and an indexed form for faster searching.

Any graphics, videos, GIFs, voice segments, emojis, or the like can be stored with, or linked to, the text information file. Similarly, meta-information (e.g., font, font size, color, or other stylization) corresponding to the text information file can also be stored or linked. Then, the processed text information file can be transferred for storage in the Squirrel Vault on the user platform or in cloud information storage.

Strings can be saved in the folders organized by names, topics, phone numbers, email addresses, device identifiers (IDs), IP address, time/date, senders/recipients, or other desired identification indicia. Information file content can be maintained even if the information about a service provider or user contact changes. Information file content can be searched, printed, or otherwise rendered from the Squirrel Vault storage in standard formats such as PDF, MS word, or other desired information storage formats.

Archived information files can be exported out and imported into the native Application from Squirrel Vault storage to restore information file conversations to multiple devices and add Acorn Generated Information Elements (AGIEs).

If after detection of a text messaging event, the module determines that the messaging event is not of interest to the user based on the Acorn Malleable Template, the module can determine 462 if the text information file corresponding to the text messaging event is part of a string already saved and monitored. If this is the case, the content of the information file can be added 464 to the saved and monitored string to create an augmented information file. Then, execution moves to block 456 in performing any of a variety of processing operations on the augmented information file and transfer the augmented text information for storage in the Squirrel Vault 458 as described above.

If the text information corresponding to the text messaging event is not part of a string already saved and monitored, the module can determine 468 if the new information file corresponding to the messaging event is to be saved and monitored. This action can be taken if the user responds to a pop-up prompt generated by the Acorn module and modifies an Acorn Malleable Template corresponding to the information event. If this is the case, the content of the new information file can be added with execution moving to block 464, as described above, to the saved and monitored text string to create an augmented information file, with a variety of processing operations 456 and transferring the information for storage in the Squirrel Vault 458 before return to monitoring 452.

If it is determined at block 468 that the new information file corresponding to the event is not to be saved and monitored, then the module returns to block 452 in continuing to monitor for these text, messaging, or voicemail information events.

It should be appreciated that during this processing the user may respond to pop-up prompts generated by the Acorn module, which in at least one example embodiment, modifies an Acorn Malleable Template corresponding to the text, messaging, or voicemail application communication event. Corresponding parameters in the Listener, Stow module and the Overwatch module will be automatically set to correspond with the user's newly configured Acorn Malleable Template.

It should be noted that for voicemail, the Voicemail Transcription Documents (VMTD) can be stored in an original form for rendering and an indexed form for faster searching.

3.8.2. Listener Module Handling Social Media

A Social Media API module operates in a manner similar to the processing of text, email and voicemail messages as described in the previous section. The Social Media API module of an example embodiment can also be configured to manage communications between the user platform and social media applications.

The Squirrel processing of the user directed actions on Social Media, such as Facebook® creates Acorn Generated Information Elements (AGIEs) identified using the Acorn Malleable Template (ACMT) to create a Social Media Transcription Document (SMTD) of the actions of the user interacting with social media. The Social Media Transcription Document (SMTD) is a new document created that archives the user interaction on the Social Media platform that retains all of the meta data of the user actions and generates a text-based document that visually replicates user actions on the platform in a continuous transcript of the sites visited, posts made by the user and the interactions with other social media users on that platform. There is a separate Social Media API module for each Social Media platform that Squirrel is monitoring with a separate and distinct Social Media Transcription Document (SMTD) created for each Social Media application the user identifies.

Figure 7:
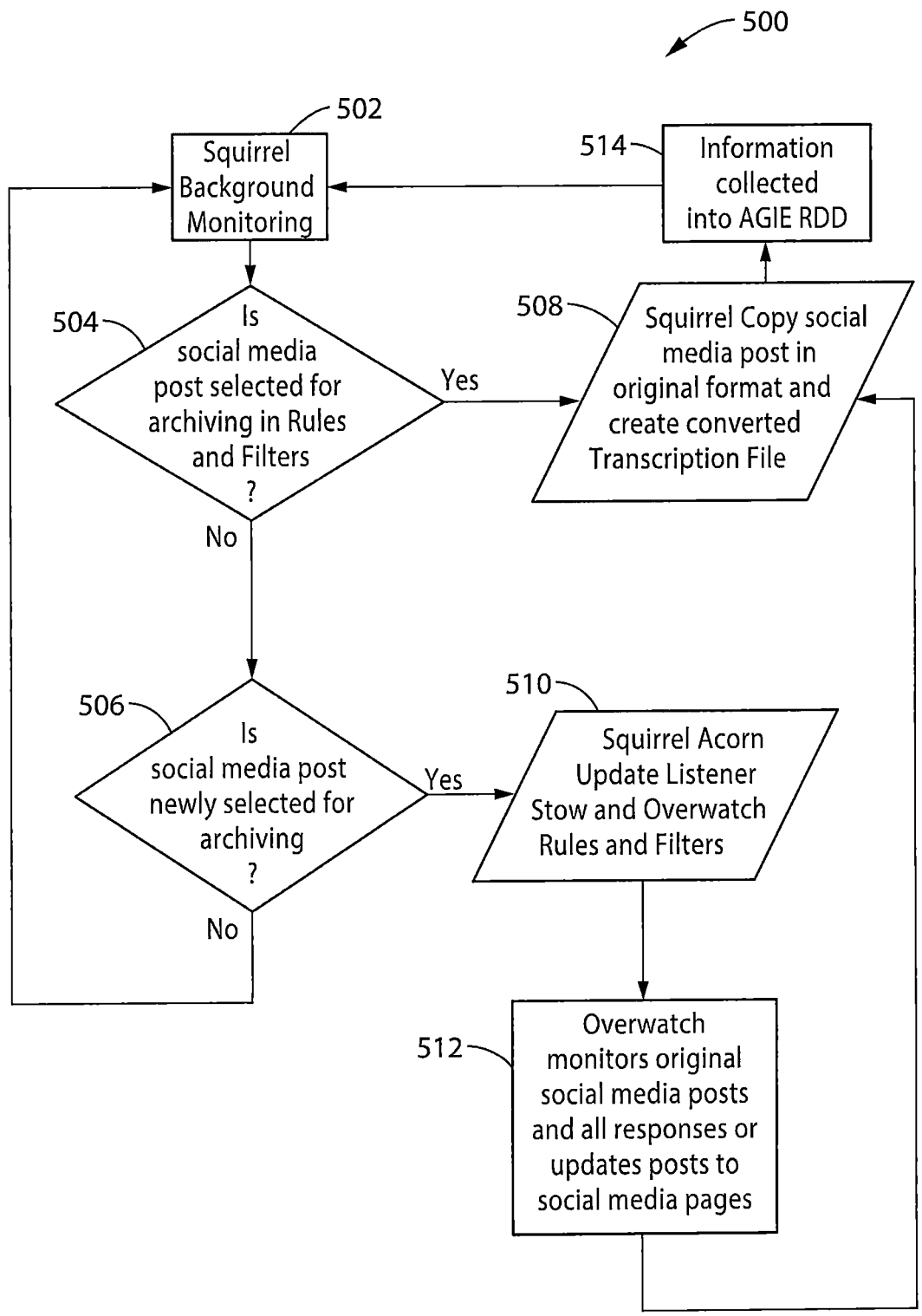
FIG. 7 is a flow diagram of Squirrel processing operations for social media application management according to at least one embodiment of the present disclosure.

FIG. 7 illustrates an embodiment 500 of Squirrel processing operations for social media application management that may be performed by the Listener module through a Social Media API module of an example embodiment. As described above, the user can configure an Acorn Malleable Template corresponding to a desired process for handling social media application communication. In particular, the user can configure the Acorn Malleable Template to specify the social media applications and the particular posts the Squirrel application should monitor and process. The Acorn module user interface can be used to configure the Acorn Malleable Templates (ACMTs). Corresponding parameters in the Listener, Stow module and Overwatch module will be automatically set to correspond with the user's configured Acorn Malleable Template.

After the user has configured an Acorn Malleable Template to manage social media application communication in a desired manner, the Squirrel application can update event triggers and subscribers to perform background monitoring 502 of the OS for social media application communication. The Listener module, described above, can be used for this purpose.

When the Social Media API module detects a social media application communication event through the OS and the Listener module, the Social Media API module can compare the social media application communication event with a Malleable Template configured by the user to determine 504 if the social media application communication event is of interest to the user.

If the social media application communication event is of interest to the user, based on the Acorn Malleable Template, then the Social Media API module or the Stow module can perform a variety of processing operations 508 on the information file (e.g., social media message posts) corresponding to the social media application communication event. For example, the Social Media API module or the Stow module can perform information conversions, decryption/encryption, compression, formatting, editing, meta-information updates, indexing, extraction operations and/or other information processing to prepare the information file for storage in the Squirrel Vault. After being processed, the information about the social media content is collected into an AGIE RDD 514, and background monitoring 502 continues.

Additionally, multiple versions of the information file can be generated to facilitate searching, storage, and rendering operations. As a result, the information file can be stored in an original form for rendering and an indexed form for faster searching. Any graphics, videos, GIFs, emojis, or other content types can be stored with, or linked to, the information file. Similarly, meta-information (e.g., font, font size, color, or other stylization) corresponding to the information file can also be stored or linked. Then, the processed information can be transferred for storage in the Squirrel Vault on the user platform or in cloud information storage. Text strings corresponding to the social media posts can be saved in the folders organized by names, topics, phone numbers, device IDs, or similar indicia.

If after detection of a social media application communication event, the appropriate application Listener Module determines that the social media application communication event is of interest to the user based on the Acorn Malleable Template, the Social Media API module can determine 506 if the information file (e.g. social medial message post) corresponding to the social media application communication event is newly selected for archiving. If it is not, then execution returns to monitoring 502.

Otherwise, at block 510 user input is collected, such as having the user respond to a pop-up prompt generated by the Acorn module toward modifying an Acorn Malleable Template corresponding to the social media application communication event. Corresponding parameters in the Listener, Stow and Overwatch modules will be automatically set to correspond with the user's newly configured Acorn Malleable Template.

The content of the new information file can be transferred 512 to the Stow module, which can perform a variety of processing operations on the information file and transfer the information for storage in the Squirrel Vault as described above. Execution then moves to block 508 as discussed earlier.

3.9. Vault Module

In an example embodiment, the Squirrel application provides a Vault module, which manages a user-specific device and cloud storage location for the archived user Acorn Generated Information Elements (AGIE).

The Vault module provides users with a single "storage cabinet" for all of their information. Stored information is encrypted and accessed only by authorized users from user approved devices. Stored information is retained in a universal format that can be accessed and rendered, even if the user changes operating systems, or if the originating application is no longer available to the user. The information is segmented by type in logical drives to facilitate efficient access.

3.10. Acorn Malleable Templates

In an example embodiment, a variety of information sources can be monitored and compared with a pre-defined set of Acorn Malleable Templates (ACMTs) which contain information, such as parameters, rules filters and AI processes which define the information content of interest to a particular user. The ACMT enables user configuration of the monitoring, processing, indexing, conversion, translation, filtering, compression, encryption, archiving, and storage of the monitored and copied information in a local or cloud information vault based on selected user options.

FIG. 8 and FIG. 9 illustrate an example of an Acorn template 550, and information elements 650 within the template. Specifically in FIG. 8 the Template is shown with an identifier "XXXXX", and has fields to indicate What is being tracked, under which are examples fields as Names, Subjects, Conversion words, given by way of example and not limitation. The template also has information on what applications are to be tracked, herein exemplified by way of example as texting application, email accounts, word processing, voice messages, social media accounts, Facebook accounts.

In FIG. 9 is shown examples of Information elements for the exemplified template, having categories for text messages, social media, word processing documents and email, again given by way of example and not limitation.

It should be appreciated that the examples are given by way of example and not limitation, as the user may select what aspects are to be tracked in the template, for what applications, and according to what specification information elements.

An Acorn module user interface can be used to configure the one or more ACMT. In an example embodiment, an ACMT can be specifically configured for particular information sources, such as file systems or particular applications, and can also be configured specifically for particular information types, such as texts, emails, social media content, word processing content, translated voice mail messages, phone numbers, addresses, and other specific information types.

In an example embodiment, there can be different types of ACMTs. For example, conducting a search of Acorn Malleable Templates can be used for extracting stored information in the format and organization selected by the user, while the search can be global or focused, cross application or single application, and configured for a particular information type. The Search through ACMTs can be configured to customize a search function by keywords, IP address, device, person, date, application, type, and other parameters as desired. A user can utilize the Acorn module user interface to configure searching through the ACMTs.

The routing of ACMTs can be continually updated and configured for information monitoring, information capture, information sorting, and information archiving, as well as creating Acorn Generated Information Elements (AGIEs). The Routing of ACMTs can be automatically modified by user preferences, such as by utilizing an artificial intelligence (AI) module that monitors the frequency and scope of user interactions with particular information files, information types, or particular applications.

In various example embodiments, there are several ways a user can generate and populate ACMTs for the Squirrel application. These methods include manual information entry options and automated ACMT information update methods. Several of these methods are described in example embodiments below.

The following describes a first ACMT update method, the user can be prompted to manually enter (populate) various ACMT fields using Squirrel Acorn Malleable Template menus or user interfaces. These menus can prompt a user to enter ACMT information used to determine the information sources and related information content of interest to the user.

The following describes a second Acorn Malleable Template update method, in which the Squirrel application can be configured to automatically access user device contact lists maintained in various formats for different applications, or in software applications being processed by a system administrator using Organizational rules on organizational devices. The Squirrel application can be further configured to automatically extract information of interest for a particular user based on a master ACMT configured for each application or software application of interest to the user. The Squirrel application can use the extracted information to automatically create an ACMT for use by the Acorn module of the Squirrel application. The applications of interest to the user can be selected by the user in a Squirrel Acorn module menu.

The following describes a third ACMT update method, in which the Stow module of the Squirrel application can be configured to automatically perform comparisons between old information and new information being monitored. For example, the content of information fields, such as name, phone number, email address, username, and similar information fields already present in a particular Acorn Malleable Template (ACMT) can be compared with new information received or information modifications or updates a user may make to the information in a contact list. When the new information is different from the old Information, the ACMT can be automatically updated with the new information. Similarly, when the Stow module detects a new Acorn Generated Information Element (AGIE) in a text message, an email, an information file, a post, or other information source, the Stow module can prompt the user to add the new information (Acorn) through using a "Pop Up" menu, or other input mechanism. As described above, prompting the user to "Acorn" the new information refers to a user's engagement with a user interface provided by the Squirrel application that allows the user to establish and configure their desired parameters for the collecting, sorting, storing, searching, and retrieval of information from various information sources, which the user prefers to be archived and controlled under the Squirrel application.

In other Acorn Malleable Template update methods, the Squirrel application can be configured to prompt the user to select the information of interest to the user and the information that will be archived and controlled under the Squirrel application.

For example, the Squirrel application can be configured to automatically review and process the information and message content in the user's email application and related email message folders. The Squirrel application can be configured to start with the most recent email messages (either sent or received). The Squirrel application can parse each email message to extract the "Sent from" (origin) address (e.g., address, name or group) and tag the origin address with a tag or label (e.g., Var1+). Then, the Squirrel application can further parse each email message to extract the recipient addresses, if the user is not the only recipient, and tag the recipient addresses with another tag or label (e.g., Var2+). The Squirrel application can further parse each email message to extract the subject line of the message and tag the subject line information with another tag or label (e.g., Var3+). Finally, the Squirrel application can use the tags generated for the email message (e.g., Var1+, Var2+, and Var3+), or a hashed derivation thereof, as a key identifier for the message and link the tags and key identifiers to the email message.

The Squirrel application can loop through the user's email folders and process each email message as described until a pre-determined number of email messages have been processed or a pre-determined number of distinct key identifiers (e.g., 250) have been collected. The Squirrel application can present the processed email message information in a list to the user through a user interface for the user to review and approve. The Squirrel application can then process the remainder of the user's mailbox and/or email message folders.

As described above, the Acorn Malleable Templates in the example embodiments, and its parameters, rules, filters and AI processes, enable user configuration of the capture, processing, placement, and encryption of the copied information for storage in a cloud information vault based on selected user options. The information captured by the Squirrel application can be indexed, converted, translated, filtered, compressed, encrypted, and archived based on the Acorn Malleable Templates as configured by the user. The parameters, rules, filters and AI processes of an Acorn Malleable Template can be configured with key words or keys, which define the information content of interest to a particular user as related to the information sources from which the information content originates. For example, a filter of a particular Acorn Malleable Template can be configured to include various key phrases such as, "Birthday" (with an option to add date information), "Party" (with an option to add a party event type, such as anniversary, graduation, or other event), or "Dinner" (with an option to add a dinner event type, such as reunion, taco Tuesday, pre-game, or any other desired event type). In each case, the Squirrel application captures any incoming or outgoing information transmissions, for example text messages, emails, social media posts, photos, video, web Information, or other content source, that includes a key phrase matching a key phrase in an Acorn Malleable Template. Any date information can be converted to a common date format for search, storage, and retrieval (e.g., YYYYMMDD) to allow for faster search processing.

Other parameters, rules, filters and AI processes of the Acorn Malleable Template(s) in the example embodiments can be customized for particular information sources, such as text messages, email messages, social media posts, or the like. For example, a text message filter of an Acorn Malleable Template can include a key information item, such as "Sent from" corresponding to a phone number or name from a contact list. In another example, an email message filter of an Acorn Malleable Template can include a key information item such as "Sent from" corresponding to an email address or a "Subject Line" corresponding to a subject line of an email message. In another example, a social media post filter of an Acorn Malleable Template can include a key information item, such as "Current Message/Post Thread Identifier." An Instagram post filter of an Acorn Malleable Template can include an Instagram photo caption. A Twitter tweet filter of an Acorn Malleable Template can include a collection of hashtags of interest to the user. A Facebook post filter of an Acorn Malleable Template can include a key information item such as "Current Thread/Caption Identifier." A YouTube video filter of an Acorn Malleable Template can include YouTube video subject/caption information for a particular video. A Whatsapp post filter or a Messenger (from Facebook) post filter of an Acorn Malleable Template can include key information, such as the names in a group post.

As described above, the Squirrel application uses Acorn Malleable Template(s) to determine the information of interest to a particular user and captures information from the various information sources that contain key information items corresponding to an Acorn Malleable Template. The captured information can be presented to the user by the Squirrel application for consideration by the user. In an example embodiment, the full text of a captured text message, email message, social media post, information file, or other source can be presented to the user to enable the user to specify the disposition of the Information.

The user interface of the Squirrel application can be configured with a "Hot Screen" or hyperlinked text, which allows the user to touch various words or phrases within the Information. The Squirrel application can highlight the portions of the information the user touches. The Squirrel application can associate the highlighted portions of the information with a key field or key information item. The Squirrel application can allow concatenation of additional phrases to the key field or key information item. When the Listener module intercepts an incoming message, text, email or voicemail from an information source, the Listener module can perform a quick search of the intercepted message, text, email or voicemail using a pre-configured Acorn Malleable Template with a set of user key information items. The Squirrel application can present the user with an option to add the intercepted message, text, email or voicemail to a list corresponding to information of interest or information to be archived.

3.11. User Directed Information Migration

Filtration and sorting of bulk file transfers initiated by the user can utilize the same Squirrel concepts of Acorn, Stow, Listener, and Overwatch to sort the files and other information using the rules and filters and AI processes to create information tables. The Squirrel application can process bulk file transfers using the same processes described above for the Acorn, Listener, Stow, Overwatch, and Vault modules to sort files or information using the user-configured Acorn Malleable Template(s) (e.g., parameters, rules, and filters and AI processes) to create archival information files.

Legal requirements for meeting the need of a chain of custody and providing security for information can be achieved through the usage of demand specific, rigid, fixed rules and filters and AI processes to organize, archive, and extract Information. Time stamp and specific user identification on all points of information access are provided throughout the Acorn, Listener, Stow, Overwatch and Vault module operations.

Usage of industry standard object or relational information based software with full encryption of stored information can ensure legal compliance with information confidentiality and security.

In addition, the Squirrel application can be configured to add a security function through the Overwatch module to apply a lock on documents or information once the documents or information have been transferred and encrypted to the Vault. At that point, an archive lock has occurred. Any external manipulation of information or attempted access of that information will cause an entry of time, date, and user ID information corresponding to the attempted access. If the user is not authorized for access, an alert will occur. Also, digital signatures, checksums, or other security measures may be used to validate the authenticity of the information content stored in the Squirrel Vault.

3.12. Example User Interface

Figure 10:
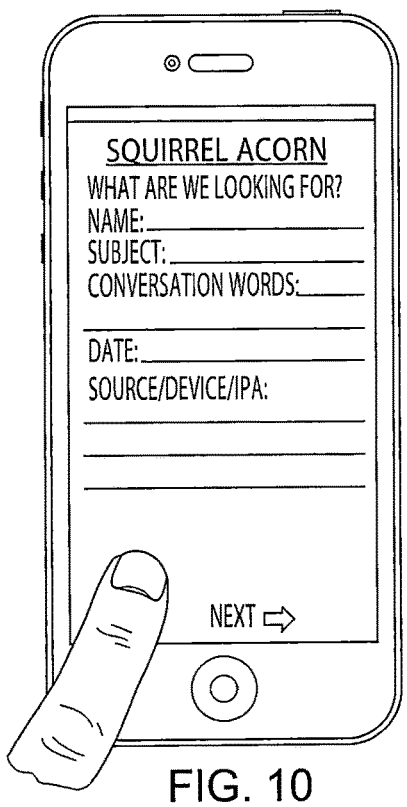
FIG. 10 through FIG. 12 is a user interface on a mobile device according to at least one embodiment of the present disclosure.
Figure 11:
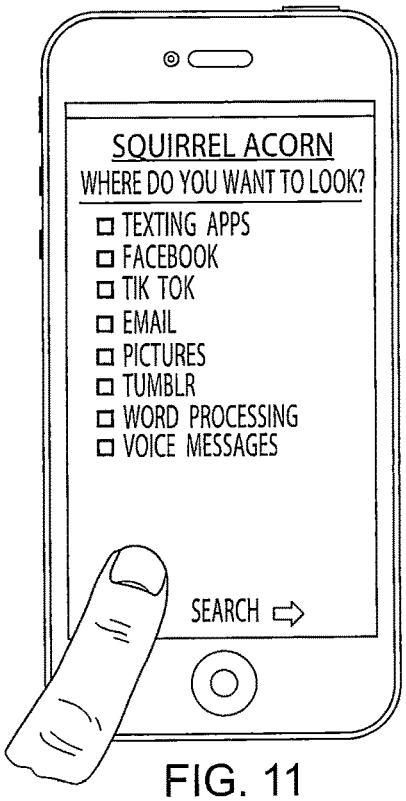
Figure 12:
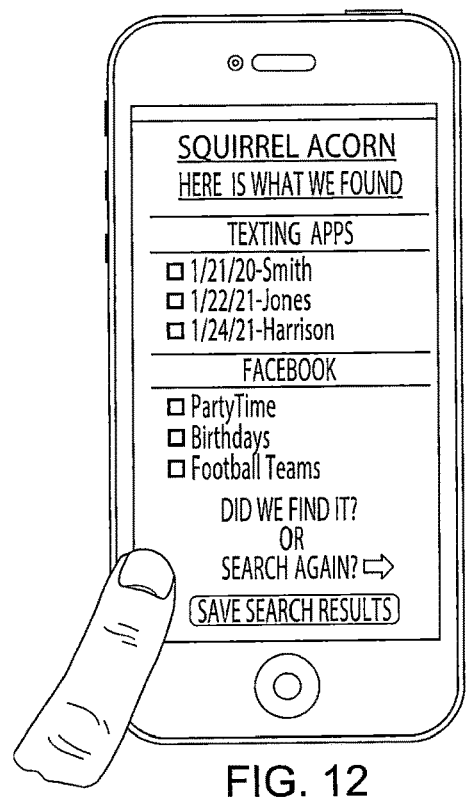

FIG. 10 through FIG. 12 illustrate an example user interface on a mobile device. As described above, the Squirrel application is an interactive assistant enabling a user to archive, store, find, and retrieve information of interest to the user. In an example embodiment implemented on a mobile device supporting a variety of applications, a master Squirrel icon can be presented on a display of the mobile device. A user can touch or mouse-key the master Squirrel icon, which can cause a Squirrel Master Menu to open or launch. The Squirrel Master Menu can present a user interface showing menu options including Acorn, Find, Devices, Memory, Settings, and other options as desired. If the user selects the Acorn option, a new menu can be presented showing a Squirrel icon at the top. The user can be prompted to select from a list of the applications and processes that the Squirrel application will monitor, archive, store, find, and retrieve as needed. An example embodiment can provide an ALL selection to select all of the listed applications. Anytime the Squirrel application detects a new incoming, or outgoing, text message, email, post, call, or other selected information transfer, a Squirrel Acorn icon can be presented to allow a user to select the information item, application, information source, subject, or other information related element, to be entered into the Overwatch monitoring process for Squirrel interaction, monitoring, processing, extraction, and archiving.

In FIG. 10 is depicted an example user interface 700 which can be presented by the Squirrel application when a user activates a "find" option provided on the user interface of a mobile device. In response to user activation of the find option or function, a menu or user interface, such as shown in the figure is presented. By way of example and not limitation, the example illustrates a menu that opens with a Squirrel icon at the top and a question to prompt the user for input, such as "What are we looking for" or "What am I looking for." The user interface can present a variety of information entry fields to prompt the user to enter a variety of search criteria. In an example embodiment, the information entry fields can include Name(s), Subject, Conversation words, Date (or date ranges), information source (e.g., device, Internet protocol address, number, or other identifier for the source). The Squirrel application can utilize the user-entered search criteria to search selected information sources and the Squirrel archived information for information items matching the search criteria.

In FIG. 11 is shown an example embodiment 800 of a user interface on a mobile device. By way of example, and not limitation, this user interface opens a menu with a Squirrel icon at the top and a question to prompt the user for input, such as "Where do you want to look?". The user interface can present a variety of information entry options to prompt the user to enter a selection of information sources from which information items will be searched against the previously entered search criteria. In an example embodiment, the various information entry options can include options corresponding to one or more texting applications, a variety of social media applications, email message folders, image or picture libraries, word processing or other documents, Voicemail transcription Information, and/or other information related sources or applications. The user can select one or more options or all options in the list. By way of example and not limitation, the figure depicts choices as "Texting Apps", "Facebook", "TikTok", "Email", "Pictures", "Tumblr", "Word processing", and "Voice Messages". Once the desired information sources are selected, the user can initiate a search by activating a SEARCH button presented on the user interface. Upon activation of the search, the Squirrel application will use the user-entered search criteria to search the selected information sources and the Squirrel archived information for information items matching the search criteria.

In FIG. 12 an example user interface embodiment 900 is shown on a mobile device with a menu that opens, such as with a Squirrel icon at the top, and which presents search results found by the Squirrel application in response to a search performed using the user-entered search criteria to search the selected information sources and the Squirrel archived information for information items matching the search criteria. In the example embodiment, the search results can be sorted based on the information sources from which the particular search results were retrieved. For example, as presented in this example, search results are shown which match the search criteria found in texting applications are listed (e.g., "Jan. 21, 2020—Smith", "Jan. 22, 2021—Jones", "Jan. 24, 2021—Harrison". These results are followed by the search results matching the search criteria found in social media apps, herein being Facebook ("PartyTime", "Birthdays", "Football Teams"). The additional search results found in the search can be similarly listed. The user can scroll down or up to see all of the search results.

In the example user interface shown, the user can also be prompted to save the search results or return to the prior menu presentations to modify the search criteria and search again. The searching can be repeated until the user obtains the desired search results. At that point, the user can exit the Squirrel application.

It will be apparent to those of ordinary skill in the art in view of the disclosure herein, that the search results can be listed and viewable in a variety of different presentations and sort order options without departing from the current disclosure.

3.13. Cross Application Personalized Storage and Retrieval

Figure 13:
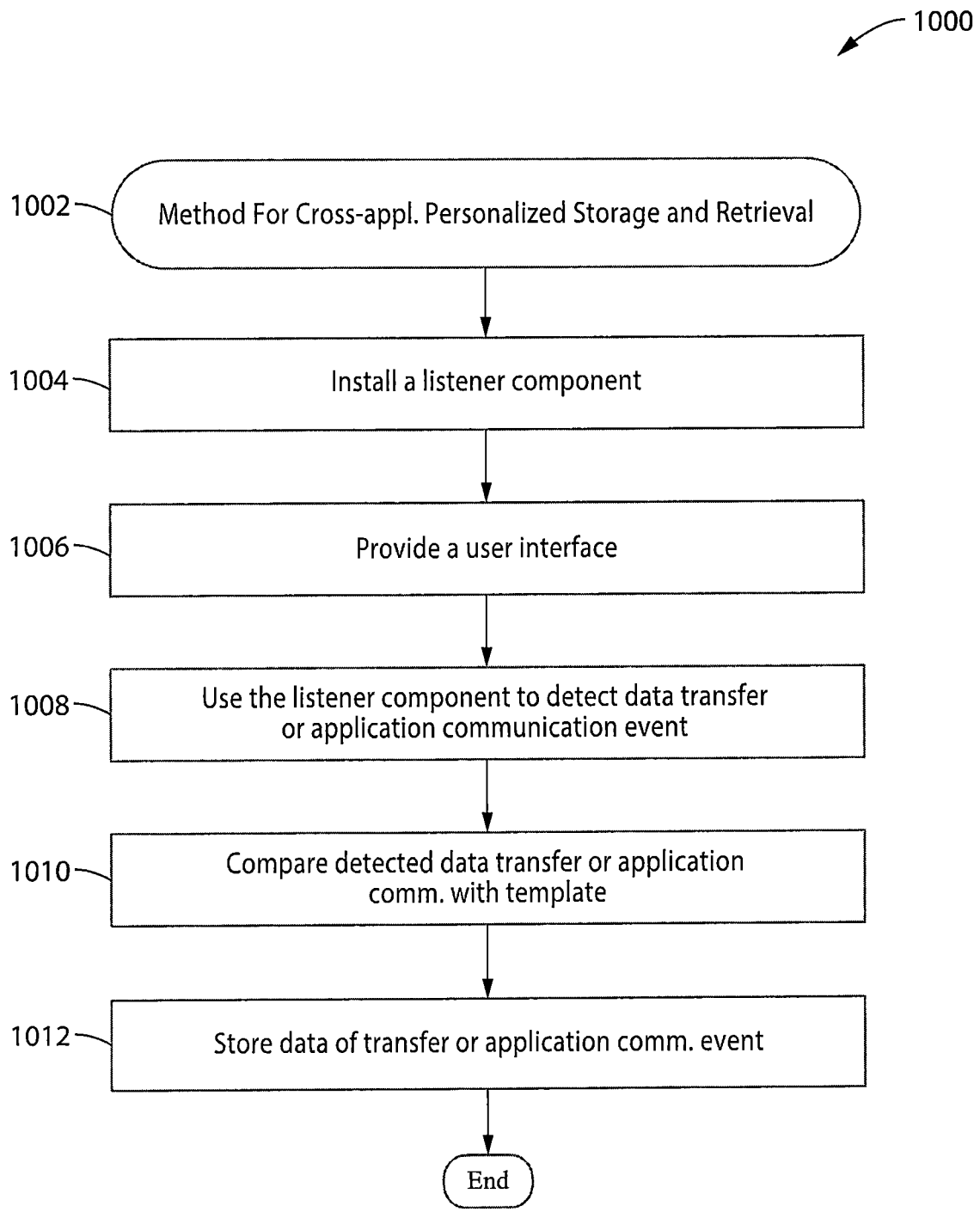
FIG. 13 is a flow diagram of general processing steps in performing cross-application personalized information storage and retrieval according to at least one embodiment of the present disclosure.

FIG. 13 illustrates an example embodiment 1000 showing general processing steps in performing cross-application personalized information storage 1002 and retrieval system as described herein. The method is shown to install 1004 a Listener component executable by an information processor under an operating system, to monitor information transfer activity and application communication on a user platform. A user interface is provided 1006 enabling a user to configure an Acorn Malleable Template specifying information transfer and application communication events of interest to the user. A Listener component 1008 is utilized for detecting information transfer or application communication events on the user platform, and comparing 1010 the detected information transfer or application communication event with the Acorn Malleable Template. Then storing 1012 of data in an archive about the information transfer or application communication event, if the information transfer and application communication event is of interest to the user based on the comparison with the Acorn Malleable Template.

Figure 14:
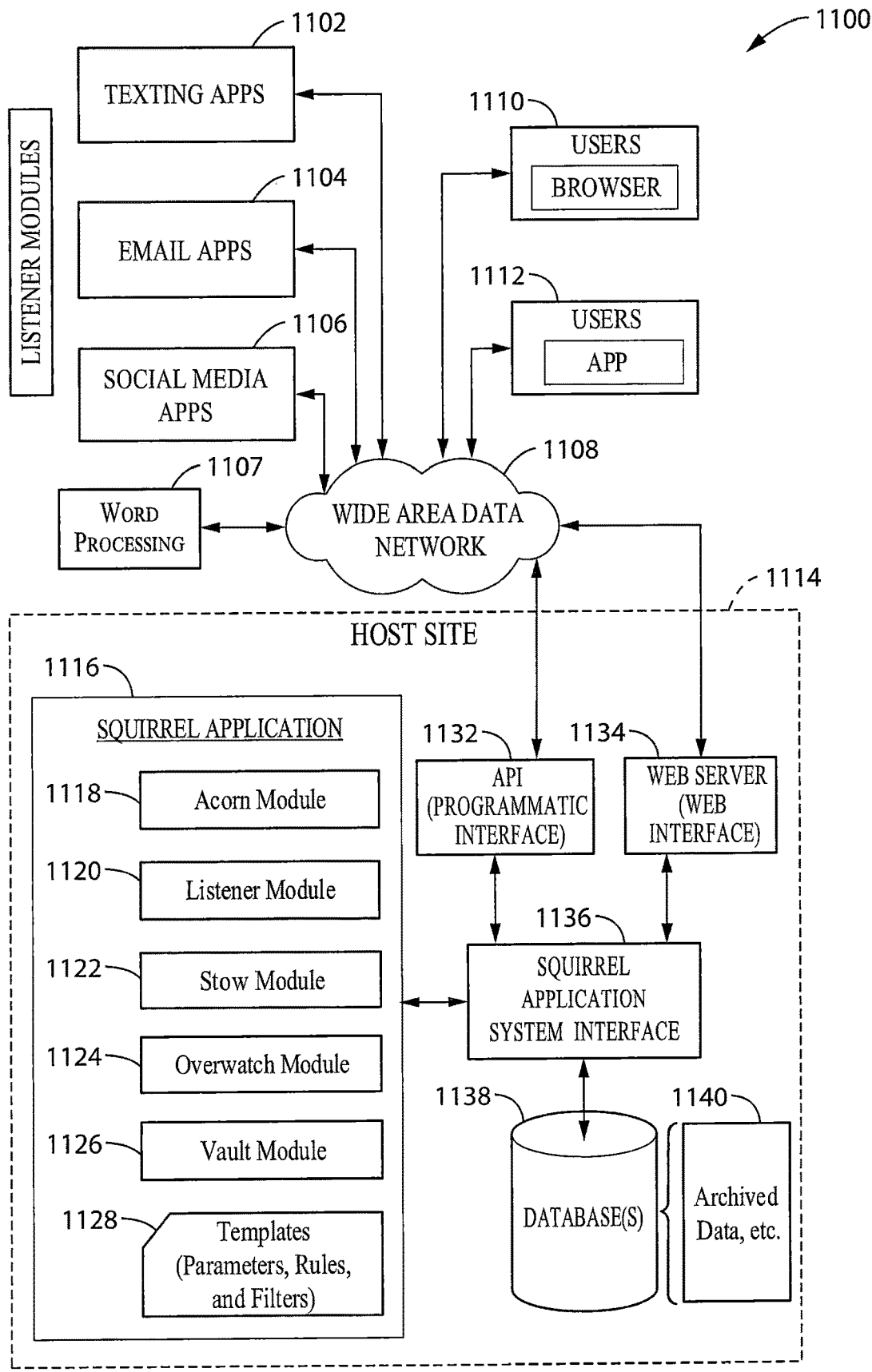
FIG. 14 is a block diagram of a networked system in which various embodiments may operate as the Squirrel System Architecture according to at least one embodiment of the present disclosure.

FIG. 14 illustrates a networked system 1100 in which various embodiments may operate as the Squirrel System Architecture. It can be seen in the upper portion of the figure the various listener modules for texting applications 1102, email applications 1104, social media applications 1106, and word processing applications 1107, which are connected to a wide area network (WAN) 1108. In addition, on the upper right are seen user interfaces through a browser 1110 and an application interface 1112, to the WAN 1108.

The host site 1114 is shown connecting to WAN 1108, and depicting the elements of the Squirrel application 1116 which connects to the Squirrel application system interface 1136. The Squirrel application interface is shown for communication with an Application Programming Interface (API) 1132, and a web server interface 1134. The Squirrel application system interface 1136 is also connected to data storage, exemplified as database 1138 and archived data and other storage 1140. It should be appreciated that the functions of these modules may be dispersed across a set of modules in different ways without departing from the teachings of the present disclosure.

Squirrel application 1116 is shown containing a number of modules, exemplified as Acorn module 1118, Listener module 1120, Stow module 1122, Overwatch module 1124, Vault module 1126, and storage 1128 for Acorn Malleable Templates (ACMTs).

4. Machine Learning and AI Recommendation

The present disclosure can provide automated management of user information across all devices. The system utilizes Natural Language Processing (NLP) and Machine Learning (ML) techniques to analyze, classify, and recommend user-generated content for storage and retrieval based on its relevance and importance. By integrating with data indexes and leveraging user interactions and feedback, the system enhances both the efficiency and accuracy of information management processes, enabling users to access personalized and relevant content seamlessly.

4.1. Interface for Setting Weights and Biases

The system provides an intuitive interface for users to set weights and biases governing the management of their information. This interface allows users to adjust parameters relating to content relevance, importance, and classification criteria according to their preferences and requirements.

4.2. Management of User Information

User-generated content, including messages, documents, and media, are automatically analyzed and classified based on their content and context using a variety of machine learning processes tailored to different types of content.

4.2.1. Text Classification for Emails and Messages

For textual content, including emails, messages, and social media posts, the system employs supervised learning processes, including Support Vector Machines (SVM) and Naive Bayes classifiers, to predict the relevance and importance of content.

Processing for Message Relevance Prediction: $P(y=1|x,w,b)=1 1+e-(w\cdot x+b) P(y=1|x,w,b)=1/1+e-(w\cdot x+b)$, where xx represents the feature vector extracted from the message content, ww denotes the model parameters, and bb is the bias term. The predicted probability $P(y=1)P(y=1)$ indicates the likelihood of the message being relevant, based on the learned model parameters.

4.2.2. Voice-to-Text Analysis for Voicemails

In at least one embodiment, voicemail content is transcribed using speech-to-text algorithms, and the resulting text is analyzed using NLP techniques. ML processes, such as Recurrent Neural Networks (RNNs) or Long Short-Term Memory (LSTM) networks, are then employed to predict the relevance and importance of the transcribed voicemail content.

Processing for Voicemail Relevance Prediction: $P(y=1|x,w,b)=\sigma(w\cdot x+b) P(y=1|x,w,b)=\sigma(w\cdot x+b)$, where xx represents the feature vector extracted from the transcribed voicemail content, ww denotes the model parameters, and bb is the bias term. The sigmoid function go ensures that the predicted probability $P(y=1)P(y=1)$ falls within the range [0, 1].

4.2.3. Content Analysis for Social Media Posts

In at least one embodiment, social media posts are analyzed using text mining and sentiment analysis techniques to extract key topics, sentiment scores, and engagement metrics. ML techniques, such as Random Forests or Gradient Boosting Machines, are then applied to predict the relevance and importance of the social media content.

Processing for Social Media Post Relevance Prediction: $P(y=1|x,w,b)=1/1+e-(w\cdot x+b)$, where x represents the feature vector extracted from the social media post content, w denotes the model parameters, and b is the bias term. Similar to message relevance prediction, the logistic function is used to compute the predicted probability $P(y=1)P(y=1)$.

4.2.4. Document Analysis for Documents and Files

In at least one embodiment, documents and files are analyzed using text processing techniques to extract metadata, keywords, and document structure. ML techniques, such as Decision Trees or Neural Networks, are then utilized to predict the relevance and importance of the documents based on their content and attributes.

Processing for Document Relevance Prediction: $P(y=1|x,w,b)=\sigma(w\cdot x+b) P(y=1|x,w,b)=\sigma(w\cdot x+b)$; where x represents the feature vector extracted from the document content and metadata, w denotes the model parameters, and b is the bias term. The sigmoid function ensures that the predicted probability $P(y=1)P(y=1)$ is bounded between 0 and 1.

These machine learning mechanisms enable the system to effectively analyze and classify user-generated content across various formats, providing personalized recommendations for content storage and retrieval based on its predicted relevance and importance.

4.2.5. Integration with Data Indexes

The system seamlessly integrates with data indexes, providing a scalable and efficient platform for storing and querying user information across all devices and platforms. Data indexing techniques are utilized to organize and manage large volumes of user-generated content effectively.

4.2.6. Recommendation Engine

A recommendation engine powered by NLP and ML components generates personalized recommendations for user content storage and retrieval. By analyzing the content and context of user interactions, the recommendation engine determines whether content should be saved for future reference based on user-defined criteria and past interactions.

The recommendation engine operates based on a set of base settings for each document and media type, which define the initial criteria for recommending content. These base settings are adjustable through the interface for setting weights and biases, allowing users to customize the recommendation criteria according to their preferences and requirements.

4.2.6.1. Adjustment of Base Settings

When users input information into the interface for setting weights and biases, such as indicating the importance of specific keywords or topics, these preferences are incorporated into the base settings of the recommendation engine. For example, if a user specifies that documents containing certain keywords related to a project are highly relevant, the recommendation engine adjusts its base settings to prioritize documents containing those keywords in future recommendations.

Similarly, if a user indicates a preference for social media posts with positive sentiment, the recommendation engine modifies its base settings to favor posts with higher sentiment scores.

The adjusted base settings are highlighted on the interface near the current setting, providing users with visibility into how their preferences influence the recommendation process.

4.2.6.2. Manual and Automatic AI Optimization

The recommendation engine offers users the flexibility to optimize its performance manually or automatically.

Manual optimization allows users to fine-tune the recommendation criteria by directly adjusting the weights and biases through the interface. This hands-on approach provides users with granular control over the recommendation process, enabling them to align the recommendations more closely with their preferences.

Automatic AI optimization leverages machine learning mechanisms to continuously learn from user interactions and feedback, refining the recommendation criteria over time. The recommendation engine automatically adjusts its base settings based on the observed user behavior, optimizing the recommendations to better match users' evolving preferences and priorities.

4.2.6.3. One-Press Option for Manual AI Optimization

To streamline the manual optimization process, the interface includes a one-press option for manual AI optimization. With a single click, users can initiate the optimization process, which applies predefined processing mechanisms to adjust the recommendation criteria based on the current user interactions and feedback. This one-press option simplifies the optimization process, allowing users to update the recommendation criteria quickly and efficiently without the need for manual adjustments.

Processing for Automatic AI Optimization

Automatic AI optimization utilizes machine learning mechanisms to adjust the recommendation criteria based on user interactions and feedback. Let $\theta$ represent the set of parameters governing the recommendation criteria, and $J(\theta)$ denote the optimization objective function. The recommendation engine updates the parameters $\theta\theta\theta$ using gradient descent, where the parameter update rule is defined as: $\theta:=\theta-\alpha\nabla J(\theta)$. Wherein $\alpha$ is the learning rate, and $\nabla J(\theta)$ is the gradient of the objective function with respect to the parameters $\theta$. The optimization objective function $J(\theta)$ aims to minimize the discrepancy between the predicted recommendations and the user feedback, ensuring that the recommendation criteria are continuously adjusted to improve user satisfaction and relevance.

5. Selected Summary Points

The following contains descriptions of selected features of the present disclosure; however, it is not a recapitulation of everything described in the full text of the instant specification.

A computer-implemented cross-application personalized information Management and retrieval system comprising: (a) a information processor; and (b) a cross-application personalized information storage and retrieval application, executable by the information processor, the cross-application personalized information storage and retrieval application being configured to: install a Listener component, executable by the information processor under an operating system, to monitor information transfer activity and application communication on a user platform; provide a user interface enabling a user to configure an Acorn Malleable Template specifying information transfer and application communication events of interest to the user; use the Listener component to detect a information transfer or application communication event on the user platform; compare the detected information transfer or application communication event with the Acorn Malleable Template; and store information corresponding to the information transfer or application communication event in an archive, if the information transfer and application communication event is of interest to the user based on the comparison with the Acorn Malleable Template.

A computer-implemented cross-application personalized information storage and retrieval system in which the cross-application personalized information storage and retrieval application being further configured to: provide a user interface enabling the user to configure a search query specifying information of interest to the user, the user interface being further configured to enable the user to specify information sources from which information is to be compared against the search query; use the search query to search the specified information sources for information items matching the search query; and retrieve the information items matching the search query.

Performing creation of unique documentation and reports from Acorn Generated Information Elements (AGIE) for the information Dynamic Adaptation Information Management System (DAIMS) administration and compliance requirements.

The Squirrel processing of the user directed actions on Social Media (i.e., FACEBOOK) creates Acorn generated information elements (AGIE) identified using the Acorn Malleable Template (ACMT) creates Social Media Transcription Documents (SMTD) of the actions of the user using social media. The Social Media Transcription Documents (SMTD) is a new document created that archives the user interaction on the Social Media platform that retains all of the meta data of the user actions and generates a text based document that visually replicates the user actions on the platform in a continuous transcript of the sites visited, posts made by the user and the interactions with other social media users on that platform. There is a separate Social Media API module for each Social Media platform that Squirrel is monitoring with a separate and distinct Social Media Transcription Documents (SMTD) created for each Social Media application the user identifies.

In at least one embodiment, the machine learning model is a neural network model; and the inputs from the Acorn Malleable Template (ACMT) to the neural network model are related to the AGIE Acorn generated information elements being processed.

The machine learning processing of Acorn Generated Information Elements (AGIE) identified by the Acorn Malleable Template (ACMT) is performed by executing machine learning Models to generate user desired Acorn Generated Information Elements (AGIE).

The machine learning processing the Acorn Generated Information Elements (AGIE) identified by the Acorn Malleable Template (ACMT) is performed by executing machine learning Models to generate the user desired Acorn generated information elements (AGIE); while the actions of Squirrel in creating the Acorn generated information elements (AGIE) results in a Regenerative Dynamic Directory (RDD) of AGIE that has a comprehensive reference list of information created by the user directed decisions for archiving and compliance requirements and where that information can be found.

The Squirrel processing of the user directed actions on Data/information migration and/or bulk Data/information processing. The processing, sorting and organizing of data migration and/or bulk file transfers is performed according to the Acorn Malleable Template (ACMT), which identified actions for execution by the machine learning processes running machine learning Models to generate the user desired Acorn Generated Information Elements (AGIE). The actions of Squirrel in creating the Acorn generated information elements (AGIE) results in a Regenerative Dynamic Directory (RDD) of Acorn Generated Information Elements (AGIE) that has a comprehensive reference list of information created by the user directed decisions for archiving and compliance requirements; which would be used, by way of example and not limitation, by a Law firm in the handling of a large volume of information given to them in relation to a lawsuit discovery request.

The Squirrel processing of the user directed actions on texting/messaging applications creates Acorn Generated Information Elements (AGIE) identified using the Acorn Malleable Template (ACMT). These actions create Texting/Messaging Transcription Documents (TMTDs) documenting the actions of the user. The Texting/Messaging Transcription Documents (TMTD) is a new document created that archives the user interaction on the texting/messaging platform that retains all of the meta data of the user actions and generates a text based document that visually replicates the user actions on the platform in a continuous transcript of the posts made by the user and the interactions with other texting/messaging users on that platform. There is a separate texting/messaging API module for each texting/messaging platform that Squirrel is monitoring with a separate and distinct Texting/Messaging Transcription Documents (TMTD) for each texting/messaging application the user identifies.

The Squirrel processing of the user directed actions on Voicemail applications creates Acorn Generated Information Elements (AGIE) identified using the Acorn Malleable Template (ACMT). These actions create Voicemail Transcription Documents (VMTD) documenting the actions of the user. The Voicemail Transcription Documents (VMTD) is a new document created that archives the user interaction on the Voicemail platform that retains all of the meta data of the user actions and generates a text based document of the audio message. There is a separate Voicemail API module for each Voicemail platform that Squirrel is monitoring with a separate and distinct Voicemail Transcription Documents (VMTD) for each texting/messaging application the user identifies.

A system for automated management of user information across all devices, comprising: (a) an interface for setting weights and biases governing content relevance and importance; (b) performing natural language processing (NLP) techniques for analyzing and classifying user-generated content; (c) performing machine learning (ML) processes for predicting the relevance and importance of user content based on historical data; (d) integrating data indexes for storing and retrieving user information; (e) generating personalized recommendations, from a recommendation engine, for content storage and retrieval based on user-defined criteria and past interactions.

The Squirrel Dynamic Adaptation Information Management System (DAIMS) provides a Vault module, which manages a user-specific device and cloud storage location for the archived user Acorn Generated Information Elements (AGIE). The Vault module provides users with a single "storage cabinet" for all of their information. Stored information is encrypted and accessed only by authorized users from user approved devices. Stored information is stored as Acorn Generated Information Elements (AGIE) and/or original information formats and retained so that can be accessed and rendered, even if the user changes operating systems or if the originating application is no longer available to the user. The information is segmented by type in logical drives to facilitate efficient access and is organized using AGIE Regenerative Dynamic Directory (RDD).

The Squirrel Dynamic Adaptation Information Management System (DAIMS) provides an AGIE Regenerative Dynamic Directory (RDD), which works with the Operating System file manager software and is the table of locations for the tracking of the Acorn generated information Elements (AGIE). The RDD is constantly updated and refreshed based on the event actions of the processing of the AGIE and the suggestions based on frequency analysis, pattern recognition, rules and filters and the AI Processes used. The AGIE RDD is resident on the user devices and synchronized with the AGIE RDD in the Squirrel Vault.

The Squirrel processing of the user directed actions on email creates Acorn Generated Information Elements (AGIE) identified using the Acorn Malleable Template (ACMT) which creates email Transcription Documents (EMTD) of the actions of the user using social media. The email Transcription Document (EMTD) is a new document created that archives the user interaction on the email platform that retains all of the meta data of the user actions and generates a text based document that visually replicates the user actions on the platform in a continuous transcript of the email interaction made by the user and the interactions with other users email on that platform. There is a separate email API module for each email platform that Squirrel is monitoring with a separate and distinct email Transcription Documents (SMTD) created for each email application the user identifies.

6. General Scope of Embodiments

As described herein for various example embodiments, a system and method for cross-application personalized information storage and retrieval are disclosed. In the various example embodiments described herein, a computer-implemented tool or software application (app) as part of a cross-application personalized information storage and retrieval system is described to automate and improve information monitoring, management, storage, and retrieval. As such, the various embodiments as described herein are necessarily rooted in computer and network technology and serve to improve these technologies when applied in the manner as presently disclosed and claimed. In particular, the various embodiments described herein improve the use of information processors and servers, information storage and retrieval systems, mobile device technology, and information network technology in the context of an automated cross-application personalized information storage and retrieval system via electronic means.

Embodiments of the technology of this disclosure may be described herein with reference to flowchart illustrations of methods and systems according to embodiments of the technology. Embodiments of the technology of this disclosure may also be described with reference to procedures, algorithms, steps, operations, formulae, or other computational depictions, which may be included within the flowchart illustrations or otherwise described herein. It will be appreciated that any of the foregoing may also be implemented as computer program instructions. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms controller, microcontroller, processor, microprocessor, hardware processor, computer processor, central processing unit (CPU), and computer are used synonymously to denote a device capable of executing the instructions and communicating with input/output interfaces and/or peripheral devices, and that the terms controller, microcontroller, processor, microprocessor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A cross-application personalized dynamic adaptation information management system (DAIMS), comprising: (a) a listener module and an overwatch module (L/O modules) are executable by an information processor under an operating system for monitoring information transfer activity and application communications on a user platform; (b) a user interface on said user platform for allowing user configuration of acorn malleable templates (ACMT) to be viewed and created which specify information transfer and application communication events of interest to be tracked and processed for the user; (c) detecting an information transfer or application communication event on the user platform and comparing the detected information transfer or application communication event with the ACMT; (d) wherein based on the ACMTs, the L/O modules compare detected information transfer or application communication events and an Acorn module which is configured for directing collected information for information storage, performs creating Acorn generated information elements (AGIE); and (e) storing AGIEs about the information transfer or application communication event in an archive, if the information transfer and application communication event matches the criterion in one or more ACMTs.

A cross-application personalized dynamic adaptation information management system (DAIMS), comprising: (a) a listener module and an overwatch module (L/O modules) are executable by an information processor under an operating system for monitoring information transfer activity and application communications on a user platform; (b) a user interface on said user platform for allowing user configuration of acorn malleable templates (ACMT) to be viewed and created which specify information transfer and application communication events of interest to be tracked and processed for the user; (c) wherein said user interface is configured to allow a user to configure a search query specifying information of interest to the user, and for specifying which information sources are to be compared against the search query in searching for information items matching the search query, and retrieving information items matching the search query; (d) wherein the system generates actions and/or recommendations to the user based on a Neural Network (NN) machine learning model, or Artificial Intelligence (AI), which is operating based on user preferences in tracking and organizing information, and wherein said user preferences are displayed in the user interface and allows configuring ACMTs to be viewed and created; (e) detecting an information transfer or application communication event on the user platform and comparing the detected information transfer or application communication event with the ACMT; (f) wherein based on the ACMTs, the L/O modules compare detected information transfer or application communication events and an Acorn module which is configured for directing collected information for information storage, performs creating Acorn generated information elements (AGIE); (g) wherein AGIE results are collected in a AGIE regenerative dynamic directory (RDD) having a reference list of information created by the user directed decisions for archiving and compliance requirements, and indicating where that information can be found; and (h) storing AGIEs about the information transfer or application communication event in an archive, if the information transfer and application communication event matches the criterion in one or more ACMTs.

A method of cross-application personalized dynamic adaptation information management, comprising: (a) monitoring information transfer activity and application communications in listening and overwatching activities on a user platform; (b) interfacing with a user through a user interface of said user platform for user configuration of acorn malleable templates (ACMT) to be created and viewed which specify information transfer and application communication events of interest to be tracked and processed for the user; (c) detecting an information transfer or application communication event on the user platform and comparing the detected information transfer or application communication event with the ACMT to determine if the event is of interest to the user; (d) based on the ACMTs, performing collection of information about the detected information transfer or application communication event into acorn generated information elements (AGIEs); and (e) storing AGIEs about the information transfer or application communication event in an archive, if the information transfer and application communication event matches the criterion in one or more ACMTs.

The apparatus or method or system of any preceding implementation, wherein said user interface is configured to allow a user to configure a search query specifying information of interest to the user, and for specifying which information sources are to be compared against the search query in searching for information items matching the search query, and retrieving information items matching the search query.

The method or system of any preceding implementation, wherein the information of the ACMTs are processed by machine learning under machine learning models to generate user desired AGIE.

The method or system of any preceding implementation, wherein the machine learning models are neural network models; and wherein the inputs from the ACMT to the neural network models from which AGIE are generated.

The method or system of any preceding implementation, wherein the system generates actions and/or recommendations to the user based on a Neural Network (NN) machine learning model, or Artificial Intelligence (AI), which is operating based on user preferences in tracking and organizing information.

The method or system of any preceding implementation, wherein said user preferences are displayed in the user interface and allows configuring ACMTs to be viewed and created.

The method or system of any preceding implementation, wherein AGIE results are collected in a AGIE regenerative dynamic directory (RDD) having a reference list of information created by the user directed decisions for archiving and compliance requirements, and indicating where that information can be found.

The method or system of any preceding implementation, wherein the RDD is refreshed based on event actions when processing AGIEs and the suggestions based on frequency analysis, pattern recognition, rules and filters and AI Processes used.

The method or system of any preceding implementation, wherein the RDD is resident on the user devices and synchronized with a vault of the dynamic adaptation information management system (DAIMS).

The method or system of any preceding implementation, wherein the system creates documentation and reports from AGIE for the dynamic information management system (DAIMS) for use in addressing administration and compliance requirements.

The method or system of any preceding implementation, wherein a separate API module is created for each platform that the system is monitoring with a separate type of transcription document.

The method or system of any preceding implementation, further comprising a vault module of the dynamic adaptation information management system (DAIMS) is configured for managing a user-specific device and/or cloud storage location for the archived user AGIEs.

The method or system of any preceding implementation, wherein the vault module provides for storing user AGIE information in a single storage location.

The method or system of any preceding implementation, wherein information stored by the vault module is encrypted for being accessed only by authorized users from user approved devices.

The method or system of any preceding implementation, wherein information stored by the vault module is segmented by type in logical drives to facilitate efficient access and is organized using the AGIE regenerative dynamic.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "substantial", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

All text in a drawing figure is hereby incorporated into the disclosure and is to be treated as part of the written description of the drawing figure.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A cross-application personalized dynamic adaptation information management system (DAIMS) comprising:
a non-transitory memory storing instructions, and a processor configured to access the non-transitory memory and execute the instructions in performing steps comprising:
(a) collecting rules in acorn malleable templates (ACMTs) from a user, wherein each ACMT specifies how DAIMS is to operate as a librarian performing its duties in the background for the user continuously updating and organizing cross application information, based on user choices for rules on collecting actions and metadata, creating and transcribing actions and information into documents, and for sorting, storing, retrieving, and managing that in acorn generated information elements (AGIEs);
(b) creating a regenerative dynamic directory (RDD) for each ACMT with transcription documents, text edit and metadata, are then noted in the associated RDD table of locations, and each RDD is continuously updated and refreshed based on the event actions of its specific ACMT, and wherein RDD table of locations are resident on a user platform executing DAIMS associated with the system;
(c) wherein said DAIMS performs tracking creation, utilization, modification, and location of information elements, generating transcription documents, and updating that information based on user activity and user established rules in ACMTs, comprising:
(i) monitoring information transfer activity and application communications, as listening and overwatch operations (L/Os) on the user platform, and on different devices containing programming of external L/Os configured for communicating through one or more application programming interface (API) gateways to the user platform executing DAIMS;
(ii) detecting an information transfer or application communication event from the L/Os;
(iii) analyzing, classifying, and recommending said information transfer or application communication events for information storage responsive to determining a sufficient match with one or more ACMTs;
(iv) wherein said analyzing of said information transfer or application communication events is performed using a machine learning process selected for the specific form of content being either emails, texts, documents, files, voice, and recommending which content is to be stored as generated information elements (AGIEs); and
(v) storing AGIEs about the information transfer or application communication event in an archive, responsive to determining that the information transfer and/or application communication event matches the criterion in one or more ACMTs.

2. The system of claim 1, wherein said transcribing actions comprise creating texting and/or messaging transcription documents (TMTD), or email transcription documents (EMTD), or voicemail transcription documents (VMTD), each documenting user actions as new documents created to archive user interactions.

3. The system of claim 1, wherein the information of the ACMTs are processed by machine learning under machine learning models to generate user desired AGIES.

4. The system of claim 3, wherein the machine learning models are neural network models; and wherein the inputs from the ACMT to the neural network models from which AGIE are generated.

5. The system of claim 1, wherein the system generates actions and/or recommendations to the user based on a neural network (NN) machine learning model, or artificial intelligence (AI), which is operating based on user preferences in tracking and organizing information.

6. The system of claim 5, wherein said user preferences are displayed allowing ACMTs to be viewed and created.

7. The system of claim 1, wherein the system creates documentation and reports from AGIE for the dynamic information management system (DAIMS) for use in addressing administration and compliance requirements.

8. The system of claim 1, wherein a separate API module is created for each platform that the system is monitoring and with a separate API for each application on that platform through which it monitors different types of content accesses.

9. The system of claim 1, further comprising a vault module of the dynamic adaptation information management system (DAIMS) is configured for managing a user-specific device and/or cloud storage location for the archived user AGIEs.

10. The system of claim 9, wherein the vault module provides for storing user AGIE information in a single storage location.

11. The system of claim 9, wherein information stored by the vault module is encrypted for being accessed only by authorized users from user approved devices.

12. The system of claim 11, wherein information stored by the vault module is segmented by type in logical drives to facilitate efficient access and is organized using the AGIE regenerative dynamic directory (RDD).

13. A cross-application personalized dynamic adaptation information management system (DAIMS), comprising:
a non-transitory memory storing instructions, and a processor configured to access the non-transitory memory and execute the instructions in performing steps comprising:
(a) collecting rules in acorn malleable templates (ACMTs) from a user, wherein each ACMT specifies how DAIMS is to operate as a librarian performing its duties in the background for the user continuously updating and organizing cross application information, based on user choices for rules on collecting actions and metadata, creating and transcribing actions and information into documents, and for sorting, storing, retrieving, and managing that in acorn generated information elements (AGIEs);
(b) creating a regenerative dynamic directory (RDD) for each ACMT with transcription documents, text edit and metadata, are then noted in the associated RDD table of locations, and each RDD is continuously updated and refreshed based on the event actions of its specific ACMT, and wherein RDD table of locations are resident on a user platform executing DAIMS associated with the system;
(c) wherein said DAIMS performs tracking creation, utilization, modification, and location of information elements, generating transcription documents, and updating that information based on user activity and user established rules in ACMTs as executed by an information processor, comprising:
(i) monitoring information transfer activity and application communications on a user platform;

(ii) interacting through a user interface, allowing a user to establish a configuration of acorn malleable templates (ACMT) to be viewed and created which specify information transfer and application communication events of interest to be tracked and processed for the user;

(iii) wherein said user interface is configured to allow a user to configure desired information manipulation parameters, rules, and filters in an ACMTs and for specifying which information sources are to be compared against the ACMTs for a sufficient match;

(iv) wherein the system generates actions and/or recommendations to the user based on a Neural Network (NN) machine learning model, or Artificial Intelligence (AI), which is operating based on user preferences in tracking and organizing information, and wherein said user preferences are displayed in the user interface and allows configuring ACMTs to be viewed and created;

(v) detecting an information transfer or application communication event on the user platform and comparing the detected information transfer or application communication event with the ACMT; and (vi) wherein based on a match between the information transfer or application communication event and the ACMTs, collected information is directed for information storage into an AGIE and noted in the RDD associated with its specific ACMT.

14. The system of claim 13, wherein the RDD is refreshed based on event actions when processing AGIEs and the suggestions based on frequency analysis, pattern recognition, rules and filters and AI Processes used.

15. The system of claim 13, wherein the RDD is resident on the user devices and synchronized with a vault of the dynamic adaptation information management system (DAIMS).

16. The system of claim 13, wherein the system creates documentation and reports from AGIE for the dynamic information management system (DAIMS) for use in addressing administration and compliance requirements.

17. A computer implemented method of cross-application personalized dynamic adaptation information management, comprising:

(a) collecting rules in acorn malleable templates (ACMTs) from a user, wherein each ACMT specifies how DAIMS is to operate as a librarian performing its duties in the background for the user continuously updating and organizing cross application information, based on user choices for rules on collecting actions and metadata, creating and transcribing actions and information into documents, and for sorting, storing, retrieving, and managing that in acorn generated information elements (AGIEs);

(b) creating a regenerative dynamic directory (RDD) for each ACMT with transcription documents, text edit and metadata, are then noted in the associated RDD table of locations, and each RDD is continuously updated and refreshed based on the event actions of its specific ACMT, and wherein RDD table of locations are resident on a user platform executing DAIMS associated with the system;

(c) wherein said DAIMS performs tracking creation, utilization, modification, and location of information elements, generating transcription documents, and updating that information based on user activity and user established rules in ACMTs, comprising steps:

(d) monitoring information transfer activity and application communications in listening and overwatching activities, as listening and overwatch operations (L/Os) on a the user platform, and on external devices containing programming of external L/Os configured for communicating through one or more application programming interface (API) gateways to the user platform executing DAIMS;

(e) detecting an information transfer or application communication event on the L/Os;

(f) analyzing, classifying, and recommending said information transfer or application communication events for information storage responsive to determining a sufficient match with one or more ACMTs;

(g) wherein said analyzing of said information transfer or application communication events is performed using a machine learning process selected for the specific form of content being either emails, texts, documents, files, voice, and recommending which content is to be stored as generated information elements (AGIEs); and (h) storing AGIEs about the information transfer or application communication event in an archive, if the responsive to determining that an information transfer and/or application communication event matches the criterion in one or more ACMTs.

* * * * *